US011788830B2

(12) United States Patent
Cihan et al.

(10) Patent No.: US 11,788,830 B2
(45) Date of Patent: Oct. 17, 2023

(54) SELF-MIXING INTERFEROMETRY SENSORS USED TO SENSE VIBRATION OF A STRUCTURAL OR HOUSING COMPONENT DEFINING AN EXTERIOR SURFACE OF A DEVICE

(71) Applicant: Apple Inc., Cupertino, CA (US)

(72) Inventors: Ahmet Fatih Cihan, Stanford, CA (US); Mark T. Winkler, San Jose, CA (US); Mehmet Mutlu, Stanford, CA (US)

(73) Assignee: Apple Inc., Cupertino, CA (US)

( * ) Notice: Subject to any disclaimer, the term of this patent is extended or adjusted under 35 U.S.C. 154(b) by 627 days.

(21) Appl. No.: 16/880,709

(22) Filed: May 21, 2020

(65) Prior Publication Data

US 2021/0010797 A1    Jan. 14, 2021

Related U.S. Application Data

(60) Provisional application No. 62/872,097, filed on Jul. 9, 2019.

(51) Int. Cl.
*G01B 9/02* (2022.01)
*G10L 15/22* (2006.01)
*G10L 15/30* (2013.01)

(52) U.S. Cl.
CPC .......... *G01B 9/02092* (2013.01); *G10L 15/22* (2013.01); *G10L 15/30* (2013.01)

(58) Field of Classification Search
CPC ..... G01B 9/02092; G10L 15/22; G10L 15/30; G10L 25/78; H04R 3/005; H04R 3/12;
(Continued)

(56) References Cited

U.S. PATENT DOCUMENTS 6,014,239 A    1/2000   Veligdan
7,507,203 B2   3/2009   Sebastian et al.
(Continued)

FOREIGN PATENT DOCUMENTS

CN    105092014    11/2015
CN    111045028     4/2020

OTHER PUBLICATIONS

Kwan et al., "Demosaicing of Bayer and CFA 2.0 Patters for Low Lighting Images," *Electronics,* 2019, vol. 8, No. 1444, pp. 1-58.
(Continued)

*Primary Examiner* — Hwa Andrew Lee
(74) *Attorney, Agent, or Firm* — Brownstein Hyatt Farber Schreck, LLP

(57) ABSTRACT

A device includes an electronic display, a cover through which the electronic display projects an image, and an array of SMI sensors. The array of SMI sensors is positioned on a same side of the cover as the electronic display. Each SMI sensor is configured to emit electromagnetic radiation toward a respective portion of: an interior surface of the cover, or a surface of a component of the device attached to the cover; and generate a respective SMI output including information indicative of vibration of the respective portion of the cover or the component. The device also includes circuitry configured to characterize a vibratory waveform impinging on the device. The vibratory waveform is characterized using at least two of the SMI outputs.

16 Claims, 16 Drawing Sheets

(58) Field of Classification Search
CPC .. H04R 2430/20; H04R 1/083; H04R 23/008; H04R 2499/15; G01H 9/00
See application file for complete search history.

(56) References Cited

U.S. PATENT DOCUMENTS

| | | |
|---|---|---|
| 8,823,775 B2 | 9/2014 | Xu et al. |
| 8,824,706 B2 | 9/2014 | Stephanou et al. |
| 9,741,344 B2 | 8/2017 | Bakish |
| 2012/0306823 A1 | 12/2012 | Pance |
| 2017/0150254 A1 | 5/2017 | Bakish et al. |
| 2018/0233129 A1 | 8/2018 | Bakish et al. |
| 2019/0090068 A1 | 3/2019 | Fishman et al. |
| 2019/0110040 A1 | 4/2019 | Doyen et al. |
| 2019/0253608 A1 | 8/2019 | Lee et al. |
| 2019/0331828 A1* | 10/2019 | Mutlu .................. G06F 3/0416 |
| 2020/0370879 A1* | 11/2020 | Mutlu .................. G06F 3/011 |
| 2022/0155052 A1* | 5/2022 | Mutlu .................. G01S 17/89 356/450 |
| 2023/0070733 A1 | 3/2023 | Whitney et al. |
| 2023/0083807 A1 | 3/2023 | Tal et al. |

OTHER PUBLICATIONS

Nie et al., "Deeply Learned Filter Response Functions for Hyperspectral Reconstruction," 2018 IEEE/CVF Conference on Computer Vision and Pattern Recognition, Salt Lake City, Utah, 2018, pp. 4767-4776.

Paschotta, "Optical Heterodyne Detection," *Encyclopedia of Laser Physics and Technology,* 1st edition, Oct. 2008, Wiley-VCH, ISBN 978-3-527-40828-3; pp. 1-8.

Rogers et al., "A universal 3D imaging sensor on a silicon photonics platform," *Nature,* Feb. 11, 2021, vol. 590, 18 pages.

Sun et al., "Large-scale nanophotonic phased array," *Nature,* Jan. 10, 2013, vol. 293, Nature, pp. 195-199.

Steinacher, "Balanced Photo-Detector BPD," Physics Basel (SP 1'023), Electronic Lab 2.17, User's Manual, Rev. 1.3, Klingelbergstr. 82, CH-4056 Basel, Switzerland, 2017, 5 pages.

* cited by examiner

SELF-MIXING INTERFEROMETRY SENSORS USED TO SENSE VIBRATION OF A STRUCTURAL OR HOUSING COMPONENT DEFINING AN EXTERIOR SURFACE OF A DEVICE

CROSS-REFERENCE TO RELATED APPLICATION

This application is a nonprovisional of and claims the benefit under 35 U.S.C. § 119(e) of U.S. Provisional Patent Application No. 62/872,097, filed Jul. 9, 2019, the contents of which are incorporated by reference as if fully disclosed herein.

FIELD

The described embodiments generally relate to devices that include self-mixing interferometry sensors and, more particularly, to a device that uses one or more self-mixing interferometry sensors to sense vibration of a structural or housing component defining an exterior surface of the device. In some embodiments, the structural or housing component for which the self-mixing interferometry sensor(s) sense vibration is a cover over an electronic display of the device.

BACKGROUND

Sensor systems are included in many of today's electronic devices, including electronic devices such as smartphones, computers (e.g., tablet computers or laptop computers), wearable electronic devices (e.g., electronic watches or health monitors), game controllers, navigation systems (e.g., vehicle navigation systems or robot navigation systems), and so on. Sensor systems may variously sense the presence of objects, distances to objects or proximities of objects, movements of objects (e.g., whether objects are moving, or the speed, acceleration, or direction of movement of objects), and so on. Sensor systems may also identify sounds made by an object or person, sounds made by an object or person interacting with its environment, or sounds made by an object or person interacting with a sensor system or device in which the sensor system is housed.

Given the wide range of sensor system applications, any new development in the configuration or operation of a sensor system can be useful. New developments that may be particularly useful are developments that reduce the cost, size, complexity, part count, or manufacture time of the sensor system, or developments that improve the sensitivity or speed of sensor system operation.

SUMMARY

Embodiments of the systems, devices, methods, and apparatus described in the present disclosure are directed to the configuration and operation of a device that includes one or more self-mixing interferometry (SMI) sensors. The SMI sensor(s) may be used to sense vibration of a structural or housing component that defines an exterior surface of the device. In some embodiments, the structural or housing component may be a cover over an electronic display of the device.

An SMI sensor is defined herein as a sensor configured to generate electromagnetic radiation (e.g., light), emit the electromagnetic radiation from a resonant cavity (e.g., a resonant optical cavity), receive a reflection or backscatter of the electromagnetic radiation (e.g., electromagnetic radiation reflected or backscattered from an object or medium) back into the resonant cavity, coherently or partially coherently self-mix the generated and reflected/backscattered electromagnetic radiation within the resonant cavity, and produce an output indicative of the self-mixing (i.e., an SMI output). The generated, emitted, and received electromagnetic radiation may be coherent or partially coherent. In some examples, the electromagnetic radiation emitted by an SMI sensor may be generated by an electromagnetic radiation source such as a vertical-cavity surface-emitting laser (VCSEL), a vertical external-cavity surface-emitting laser (VECSEL), a quantum-dot laser (QDL), a quantum cascade laser (QCL), or a light-emitting diode (LED) (e.g., an organic LED (OLED), a resonant-cavity LED (RC-LED), a micro LED (mLED), a superluminescent LED (SLED), or an edge-emitting LED), and so on. The generated, emitted, and received electromagnetic radiation may include, for example, visible or invisible light (e.g., green light, infrared (IR) light, ultraviolet (UV) light, and so on). The output of an SMI sensor may include a photocurrent produced by a photodetector (e.g., a photodiode), which photodetector is integrated with, or positioned under, above, or next to, the sensor's electromagnetic radiation source. Alternatively or additionally, the output of an SMI sensor may include a measurement of the current or junction voltage of the SMI sensor's electromagnetic radiation source.

In a first aspect, the present disclosure describes a device including an electronic display, a cover through which the electronic display projects an image, and an array of SMI sensors. The array of SMI sensors may be positioned on a same side of the cover as the electronic display. Each SMI sensor may be configured to emit electromagnetic radiation toward a respective portion of: an interior surface of the cover, or a surface of a component of the device attached to the cover; and generate a respective SMI output including information indicative of vibration of the respective portion of the cover or component. The device may also include circuitry (including for example, a processor programmed by software) configured to characterize a vibratory waveform impinging on the device. The vibratory waveform may be characterized using at least two of the SMI outputs.

In another aspect of the disclosure, the present disclosure describes a device including a structural component defining an exterior surface of the device, and at least one SMI sensor positioned behind the structural component. Each SMI sensor may be configured to emit electromagnetic radiation toward: a respective interior portion of the structural component, or a surface of an internal component of the device attached to the structural component; and generate an SMI output including information indicative of vibration of the structural component or the internal component. The device may also include circuitry (including, for example, a processor programmed by software) configured to identify a user command contained within the information indicative of the vibration of the structural component, and configured to execute or transmit the user command or the internal component.

In another aspect, the present disclosure describes an interactive device. The interactive device may include a frame, a cover, an electronic display, and an SMI sensor. The frame may define part of an interior volume and an opening to the interior volume. The cover may be attached to the frame to cover the opening, and may further define the interior volume. The electronic display may be disposed within the interior volume and configured to emit light through the cover. The SMI sensor may be sealed within the interior volume and positioned to emit electromagnetic radiation toward an interior surface of the cover or a surface of an internal component of the interactive device. The SMI sensor may also be configured to generate an output indicative of vibration of the cover or the internal component.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
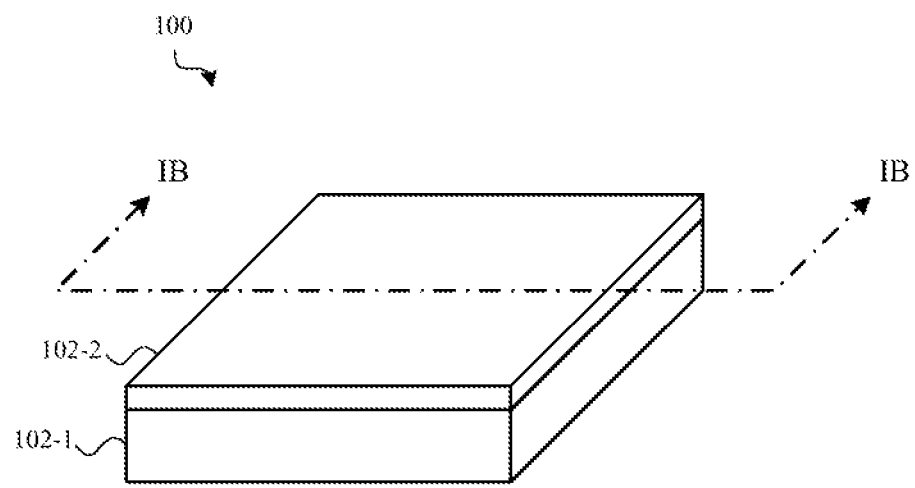
FIGS. 1A and 1B show an example of a device that includes a set of structural or housing components, and an SMI sensor for sensing vibration of one of the structural or housing components.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The following description relates to the configuration and operation of SMI sensors behind a structural or housing component of a device, such as the configuration and operation of an SMI sensor (or array of SMI sensors) disposed behind a cover over an electronic display.

As speech recognition is improving and becoming more widely available, microphones are becoming increasingly important as input devices for interacting with devices (making the devices interactive devices). In a conventional microphone, sound waves are converted to acoustic vibrations on the membrane of the microphone, which requires a port for air to move in and out of the device beneath the microphone. The port can make the device susceptible to water damage, clogging, and humidity, and can be a cosmetic distraction. Due to sensitivities that are much better than the wavelength of the used light, an SMI sensor (or array of SMI sensors) can be used as an alternative to a traditional diaphragm-based microphone. An SMI sensor may sense vibrations induced by sound and/or taps on a surface. Unlike a conventional diaphragm-based microphone, an SMI sensor can operate in an air-tight (or sealed) environment.

One or multiple SMI sensors can be used in a port-less device, without interfering with the cosmetics of the device (e.g., there is no need for a port), and without compromising a device's water resistance.

These and other techniques are described with reference to FIGS. 1A-11. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "beneath", "left", "right", etc. may be used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. The use of alternative terminology, such as "or", is intended to indicate different combinations of the alternative elements. For example, A or B is intended to include, A, or B, or A and B.

Figure 1B:
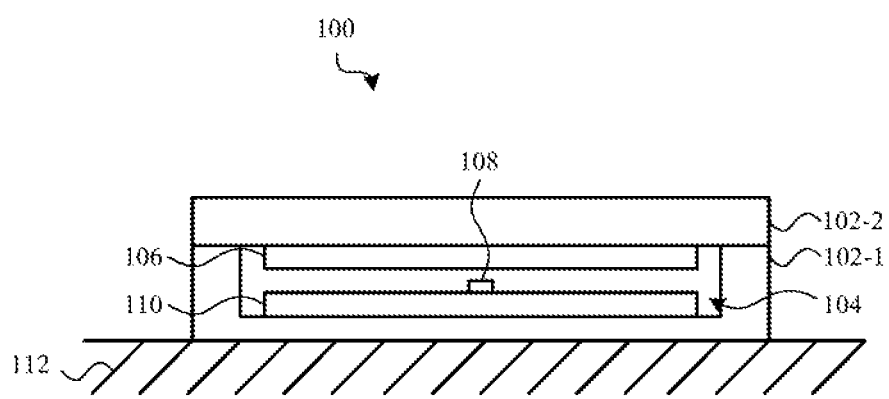

FIGS. 1A and 1B show an example of a device 100 that includes a set of structural or housing components 102, and an SMI sensor 108 for sensing vibration of one of the structural or housing components 102. The structural components 102 define an interior volume 104 of the device 100. FIG. 1A shows an isometric view of the device 100, and FIG. 1B shows a cross-section of the device 100.

In some embodiments, the set of structural components 102 may include a frame 102-1 and a cover 102-2 (e.g., a front cover). At least some of the structural components (e.g., each of the frame 102-1 and the cover 102-2) may define part of the interior volume 104. Other structural components (e.g., a back cover opposite the cover 102-2) may or may not define part of the interior volume 104. In some embodiments, the frame 102-1 may define an opening to the interior volume 104, and the cover 102-2 may be attached to the frame 102-1 to cover the opening. In some cases, the frame 102-1 may be a multi-part frame, such as a frame formed by a support plate and one or more edge members extending from the support plate to support the cover 102-2. In some cases, the edge members may define a sidewall of the device 100. In some cases, the set of structural components 102 may include alternative or additional components. The structural components 102 may be semi-permanently or detachably joined to one another by a set of fasteners, adhesives, seals, or other components.

In some embodiments, the interior volume 104 may be sealed to prevent gases (e.g., air) or fluids (e.g., water) from entering or leaving the interior volume 104. In other embodiments, the interior volume 104 may not be sealed, thereby allowing gases and possibly fluids to enter or leave the interior volume 104. In some embodiments, the interior volume 104 may be vented. For example, an optional port (or ports) may be defined in one or more of the structural components 102, and the port(s) may allow gases (e.g., air) but not fluids (e.g., water) to flow between the interior volume 104 and an ambient environment of the device 100.

In some cases, the frame 102-1 may include metal and/or plastic components. The cover 102-2 may be a transparent cover, such as a glass, sapphire, or plastic cover. In some cases, the cover 102-2 may have one or more portions (e.g., a perimeter) coated with an opaque ink or other material that blocks at least visible light and hides internal components of the device 100 (i.e., components positioned under the opaque ink).

An electronic display 106 may be disposed within the interior volume 104 and configured to emit or project light (e.g., light that defines an image) through the cover 102-2. The electronic display 106 may be partially or completely surrounded by the frame 102-1 or cover 102-2, and in some cases may be mounted to the frame 102-1 and/or the cover 102-2. The electronic display 106 (or "display") may include one or more light-emitting pixels or elements, and in some cases may be an LED display, an OLED display, an LCD, an electroluminescent (EL) display, a laser projector, or other type of electronic display. In some embodiments, a display stack (or device stack) including the electronic display 106 may include, or be associated with, one or more touch and/or force sensors that are configured to detect a touch and/or force applied to an exterior surface of the cover 102-2.

An SMI sensor 108 may be positioned within the interior volume 104 and configured to detect vibration of the cover 102-1 (e.g., a varying displacement of the cover 102-1 in a direction perpendicular to a beam of electromagnetic radiation emitted by the SMI sensor 108). The cover 102-2 may vibrate, for example, when a user touches or taps on the cover 102-2; when a user makes sounds that propagate to the cover 102-2 as vibratory waveforms; when a user, machine, or object taps on (or otherwise propagates vibrations into or along) a rigid surface (e.g., a table-top 112) on which the device 100 is resting, or to which the device 100 is attached, and the vibrations propagate from the surface to the frame 102-1 or cover 102-2; or when a sound wave or mechanical wave (i.e., a vibratory waveform) otherwise propagates to the cover 102-2. In some cases, a user of the device 100 may use multiple fingers to tap a rhythmic or melodic pattern that the device 100 identifies as a user command or other user input. Different rhythmic or melodic patterns may be associated with different user commands or user inputs. For example, if the device 100 receives a call and rings (or vibrates), a double-tap on a table-top 112 supporting the device 100 may be interpreted by the device 100 as an "answer call and activate speaker" command, but a triple-tap on the table-top 112 may be interpreted as a call reject command. In another example, if the device 100 is playing a song, a double-tap on a table-top 112 supporting the device 100 may be interpreted by the device 100 as a "skip" or "next song" command, but a triple-tap on the table-top 112 may be interpreted as a "repeat song" or "back" command. In yet another example, the device 100 may call a predetermined phone number or activate a virtual assistant upon identifying a particular rhythmic or melodic pattern of tapping in a received sequence of vibrations.

In some cases, the SMI sensor 108 may be included or embedded in a display stack of the device 100, or positioned below the display stack. In other cases, the SMI sensor 108 may be included in a module having a housing bonded to the cover 102-2. In any case, the SMI sensor 108 may be positioned to emit electromagnetic radiation toward an interior surface or portion of the cover 102-2 or a surface of a component of the device 100 (e.g., the electronic display 106 or a component of the display stack) that is attached to the cover 102-2, and to receive reflections or backscatters of the emitted electromagnetic radiation back into a resonant cavity (e.g., an optical resonant cavity) of the SMI sensor 108, where the reflected or backscattered electromagnetic radiation coherently (or at least partially coherently) mixes with the electromagnetic radiation generated by the SMI sensor 108.

The SMI sensor 108 may include an electromagnetic radiation source such as a VCSEL, a VECSEL, a QDL, a QCL, or an LED. The SMI sensor 108 may also include an electromagnetic radiation detector (e.g., a photodetector, such as a photodiode) that produces an SMI output. Alternatively, an SMI output may be obtained by measuring the junction voltage of, or current flow through, the electromagnetic radiation source. The junction voltage may provide an SMI output when the electromagnetic radiation source is driven by a constant bias current. The current may provide an SMI output when the electromagnetic radiation source is driven by a constant bias voltage. In all of these cases, the SMI output may include information indicative of vibration of the cover 102-2 (e.g., information regarding a displacement of the cover 102-2, velocity (or speed) of the cover 102-2, absolute distance to the cover 102-2, and so on).

When the interior surface of the cover 102-2 (or surface of an internal component), toward which the SMI sensor 108 emits electromagnetic radiation, is anything other than fully transparent to the electromagnetic radiation emitted by the SMI sensor 108, the cover 102-2 or surface itself may reflect or backscatter electromagnetic radiation emitted by the SMI sensor 108 back into the electromagnetic radiation source of the SMI sensor 108. When the cover 102-2 or surface is fully transparent to the electromagnetic radiation emitted by the SMI sensor 108, or when the cover 102-2 or surface is too transparent to provide a reflection or backscatter that causes the SMI sensor 108 to produce an SMI output with a great enough signal-to-noise ratio (SNR), a reflective coating or element may be applied to or attached to the interior surface of the cover 102-2 or surface of the internal component, or the interior surface of the cover 102-2 or internal component may be treated (e.g., polished). In some cases, the reflective coating or element may be partially or fully transparent to wavelengths of electromagnetic radiation other than the wavelength emitted by the SMI sensor 108.

In some cases, the SMI sensor 108 may be sealed within the interior volume 104. The SMI sensor 108 may be sealed within the interior volume 104 because an SMI sensor is capable of detecting small movements of the cover 102-2, which movements do not require air flow into and out of the device 100. However, in some embodiments, the SMI sensor 108 may not be sealed within the interior volume 104. The SMI sensor 108 may be sealed within the interior volume 104 by means of the interior volume 104 as a whole being sealed, or by a module housing or encapsulant that is disposed around the SMI sensor 108.

In some embodiments, the device 100 may include multiple SMI sensors 108. The multiple SMI sensors 108 may be disposed on a common substrate, or may be individually positioned at different locations behind the cover 102-2.

The device 100 may further include circuitry 110 that filters, conditions, and/or digitizes the SMI signal(s), saves the digitized SMI signal(s), and/or provides the digitized SMI signal(s) to portions of the circuitry 110 that evaluate the SMI signal(s), transmit the SMI signal(s), or maintain or modify operation of the device 100 based on an evaluation of the SMI signal(s) and/or other signals or information. In some cases, the circuitry 110 may sum a set of SMI outputs in the time domain—before or after the SMI outputs are digitized. In some cases, the circuitry 110 may sum the FFT power spectrum of the SMI outputs in the frequency domain. Summing the SMI outputs or their power spectrum may improve vibration detection sensitivity by amplifying detected vibrations, thereby increasing the SNR with the number of SMI outputs summed. Noise typically increases sub-linearly with the number of SMI outputs due to the lack of noise correlation between different SMI sensors. In some embodiments, the circuitry 110 may include a processor.

The device's dimensions and form factor are arbitrarily chosen, and may suggest that the device 100 is a mobile phone (e.g., a smartphone), an electronic watch (e.g., a smart watch), a tablet computer, a television (TV), or a computer monitor. However, the device's dimensions and form factor can be varied to define any type of portable electronic device, such as a laptop computer, a portable music player, a health monitor device, a vehicle navigation system, a robot navigation system, or any other portable or mobile device. The device 100 could also be a device that is permanently or semi-permanently located (or installed) at a single location, such as an appliance (e.g., a refrigerator, washing machine, dryer, thermostat, microwave, dishwasher, oven, and so on).

The cover 102-2 or electronic display 108 may be larger or smaller with respect to the entirety of the device 100, and the electronic display 108 may have a higher or lower resolution. For example, if the device 100 is a smartphone or TV, the cover 102-2 and electronic display 108 may span most or all of one cross-section of the device 100. However, if the device 100 is a refrigerator, the cover 102-2 and electronic display 108 may occupy substantially less than half of the exterior surface of one door of the refrigerator. If the device 100 is a toaster, the electronic display 108 may be a monochrome LCD that only displays alphanumeric characters and/or icons.

Although the device 100 is described as having an electronic display 108 that is visible through a transparent cover 102-2, the cover 102-2 may in some cases be opaque, and the device 100 may not have an electronic display. In these examples, the cover 102-2 may be an opaque plastic cover, a metal cover, or a transparent cover coated with an opaque ink. The SMI sensor 108 may nonetheless detect vibration of the cover 102-2 (or a component of the device 100 that is attached to the cover 102-2). In some cases, the cover 102-2 may extend around part or all of the frame 102-1.

Figure 2A:
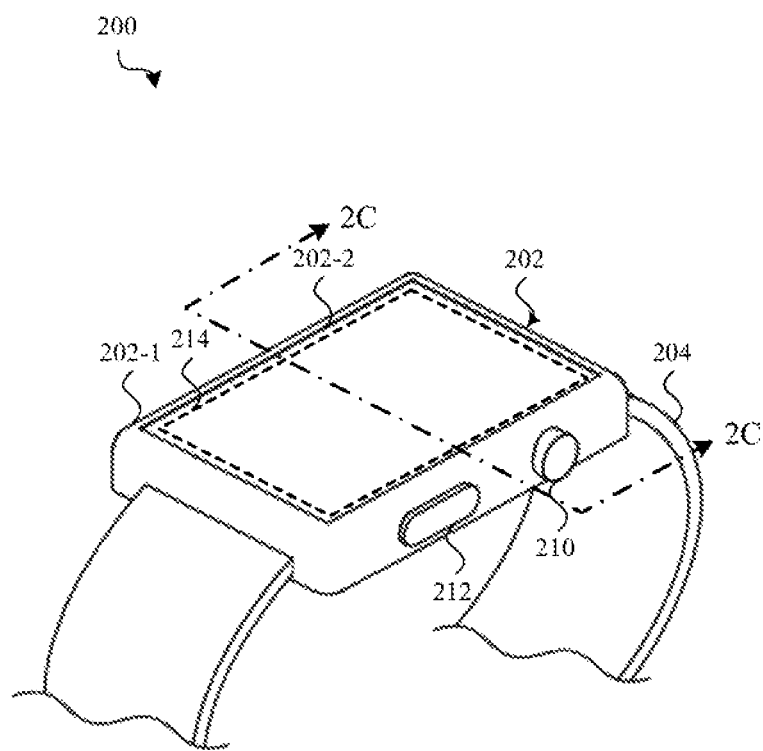
FIGS. 2A-2C show another example of a device that includes an SMI sensor for sensing vibration of a structural or housing component of the device.
Figure 2B:
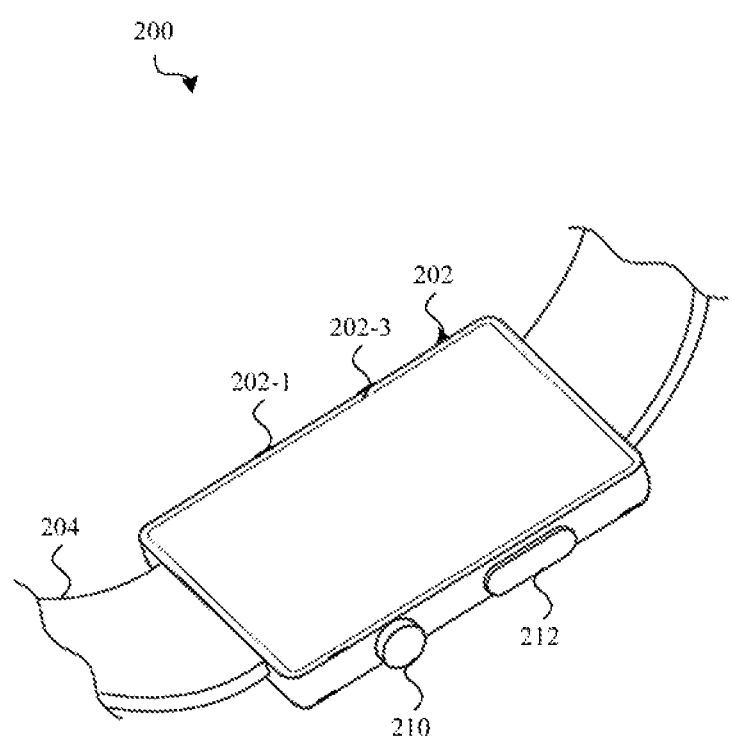
Figure 2C:
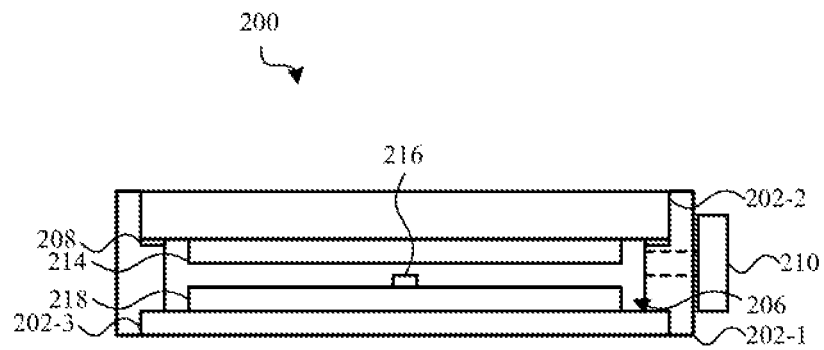

FIGS. 2A-2C show another example of a device 200 that includes an SMI sensor 216 for sensing vibration of a structural or housing component of the device 200. The device's dimensions and form factor, and inclusion of a band 204, suggest that the device 200 is an electronic watch. However, the device 200 could alternatively be any wearable electronic device. FIG. 2A shows a front isometric view of the device 200; FIG. 2B shows a rear isometric view of the device 200; and FIG. 2C shows a cross-section of the device 200.

The device 200 may include a body 202 (e.g., a watch body) and a band 204. The body 202 may include a set of structural components that define a cavity or interior volume 206 within the body 202. By way of example, the set of structural components 202 may include a frame 202-1 and a cover 202-2 (e.g., a front cover). The cover 202-2 may be mounted to the frame 202-1 to cover an opening defined by the frame 202-1 (i.e., an opening into the interior volume 206). Other structural components (e.g., a back cover 202-3 opposite the front cover 202-2), may or may not define part of the interior volume 206. Each of the covers 202-2, 202-3 may be mounted to the frame 202-1 using fasteners, adhesives, seals, or other components or layers. In some embodiments, a gasket 208 (see, FIG. 2C) may be positioned between the frame 202-1 and the front cover 202-2. The gasket 208 may be a force-sensing gasket (e.g., a gasket having one or more sets of capacitively coupled electrodes coupled to force-sensing circuitry) or a non-force-sensing gasket. A first adhesive may be disposed between the gasket 208 and the frame 202-1, and a second adhesive (which may have the same or a different composition as the first adhesive) may be disposed between the gasket 208 and the cover 202-2. More generally, any number of layers of material may be used to attach the cover 202-2 to the frame 202-1.

The watch body 202 may include an input or selection device, such as a crown 210 and/or button 212. The band 204 may be used to attach the body 202 to a body part (e.g., an arm, wrist, leg, ankle, or waist) of a user.

The frame 202-1 may at least partially surround an electronic display 214. The front cover 202-2 may be positioned over the display 214, and may provide an exterior surface through which the display 214 may project an image or be viewed. In some embodiments, the display 214 may be attached to (or abut) the frame 202-1 and/or the cover 202-2. In some embodiments, the display 214 may have an active area defined by an array of light-emitting elements, and a non-active area that either 1) does not include light-emitting elements, 2) does not include visible light-emitting elements, or 3) includes light-emitting elements that are inactive or are hidden from view by an opaque ink (or other light-blocking element) that is applied to or abuts the cover 202-2 to define a picture frame around the display 214. In alternative embodiments, the display 214 may not be included and/or the frame 202-1 may have an alternative configuration.

The frame 202-1 may in some cases incorporate aspects of the frame 102-1 described with reference to FIGS. 1A and 1B; the cover 202-2 may incorporate aspects of the cover 102-2 described with reference to FIGS. 1A and 1B; and the display 214 may incorporate aspects of the display 108 described with reference to FIGS. 1A and 1B.

Figure 2D:
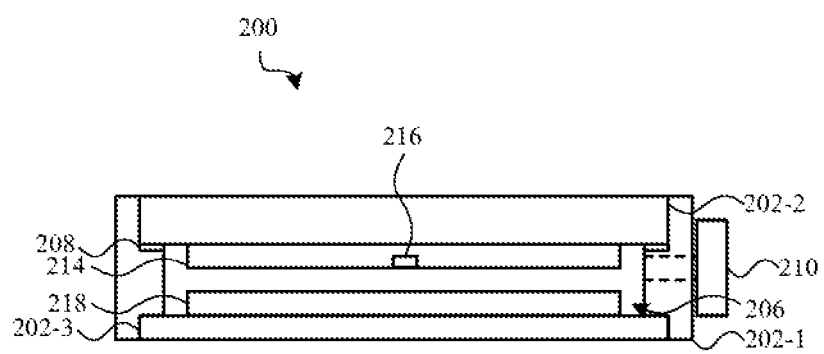
FIGS. 2D and 2E show alternative example locations where an SMI sensor may be placed.
Figure 2E:
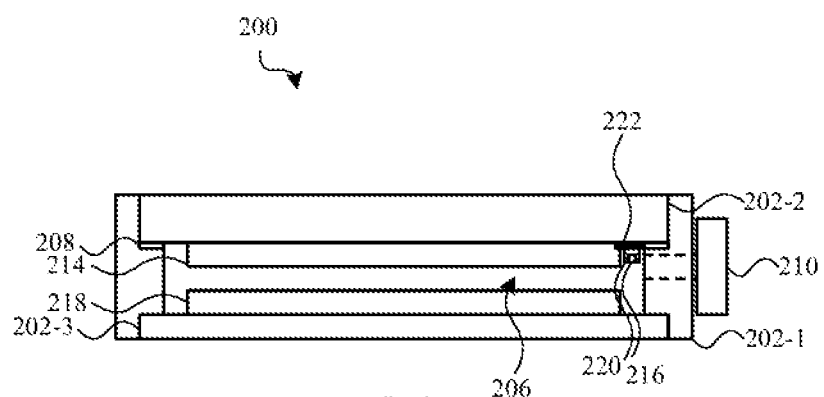

The device 200 may include various sensors, and in some embodiments may include some or all of the sensors included in the device 100 described with reference to FIGS. 1A and 1B. One of the device's sensors may be an SMI sensor 216. The SMI sensor 216 may be positioned behind the cover 202-2, and in some cases may be further positioned behind the display 214, as shown in FIG. 2C. In these embodiments, the SMI sensor 216 may emit electromagnetic radiation from within, behind, and/or through the active area of the display 214 (e.g., between metal traces and other structures of the display 214). Microlenses or other optical elements may be employed, in some cases, to direct and/or focus electromagnetic radiation toward the cover 202-2 and/or toward the SMI sensor 216 (e.g., for reflected or backscattered electromagnetic radiation). Alternatively, electromagnetic radiation may be directed toward a back surface of the display 214, an intermediate layer of a display stack, or another internal component of the device 200 that is attached to the cover 202-2 (i.e., the SMI sensor 216 may emit electromagnetic radiation toward a surface of a component that is attached to the cover 202-2, and through which vibratory waveforms incident on the cover 202-2 ultimately propagate, such that the electromagnetic radiation may not need to reach the cover 202-2). As another alternative, the SMI sensor 216 may be integrated into a layer of the display 214, as shown in FIG. 2D. In this case, the electromagnetic radiation emitted by the SMI sensor may also be emitted from within the active area of the display 214. As another alternative, the SMI sensor 216 may be disposed adjacent to a side of and/or over the display 214, as shown in FIG. 2E. In the latter case, the SMI sensor 216 may be included in a package or module attached directly to the cover 202-2. For example, the SMI sensor 216 may be included in a module 220 having sidewalls that are adhesively bonded to an inner surface of the cover 202-2, under an opaque ink 222 applied to the inner surface of the cover 202-2, bordering the active area of the display 214.

The SMI sensor 216 may be configured as described with reference to FIGS. 1A and 1B, to sense vibration of the cover 202-2 (e.g., a varying displacement of the cover 202-2 in a direction perpendicular to a beam of electromagnetic radiation emitted by the SMI sensor 216). In some cases, the sensed vibrations may be generated by sound waves that impinge on the cover 202-2 (e.g., when a user of the device 200 speaks). In some cases, the sensed vibrations may be generated by a user tapping or swiping a finger or stylus on the cover 202-2. In some cases, the sensed vibrations may propagate from the frame 202-1 to the cover 202-2, or from the back cover 202-3 to the frame 202-1 to the cover 202-2. These vibrations may include, for example, vibrations resulting from biological processes of the user (e.g., a heartbeat or heart rhythm), or vibrations resulting from a user tapping a body part on a surface of an object, or tapping body parts together (e.g., finger taps or snaps). To enable vibrations to propagate to the cover 202-2 from other structural components of the device 200, sufficiently rigid layers of material or other fasteners may be used to attach the covers 202-2, 202-3 to the frame 202-1, such that the layers or fasteners propagate vibrations to the cover 202-2. Alternatively, the device 200 may be configured to operate under the assumption that vibrations propagating to the cover 202-2 from the frame 202-1 or rear cover 202-3 may be attenuated.

In some embodiments, the SMI sensor 216 may be sealed within the interior volume 206. In some embodiments, the SMI sensor 216 may not be sealed within the interior volume 206. The SMI sensor 216 may be sealed within the interior volume 206 by means of the interior volume 206 as a whole being sealed, or by a module housing or encapsulant that is disposed around the SMI sensor 216. Sealing the interior volume 206 may improve the device's water resistance or make the device 200 waterproof under some conditions.

The device 200 may include circuitry 218 (e.g., a processor and/or other components) configured to extract, from an SMI output of the SMI sensor 216, information indicative of vibration of the cover 202-2. The information may in some cases be digitized, and then processed, stored, transmitted, or used to modify operation of the device 200. In some cases, the information may contain a user command that is spoken, sung, or tapped by the user, such that it causes vibration of the cover 202-2. The circuitry 218 may identify the user command, and then execute or transmit the user command. The user command may be any command, but in some cases may be a command to transition the electronic display 214 from a low power or no power state to an operating power state (e.g., a wakeup command), start an application, end an application, activate a virtual assistant, answer or decline a call, pause audio or video playback, and so on.

In some cases, the device 200 may include one or more skin-facing sensors that sense parameters of a user through (or via) the back cover 202-3. These sensors may include, for example, a heartrate monitor, a respiration rate monitor, or a blood pressure monitor, among other sensors. In some embodiments, an SMI sensor may be disposed within the device 200 and configured to detect vibration of the back cover 202-3. In this manner, the SMI sensor may be used to determine, from the vibration, a user's heartrate, respiration rate, or blood pressure from vibration of the user's body caused by the user's heart or lungs.

The vibration sensing described with reference to the device 200 may be employed in other types of devices having an electronic display, such as mobile phones, computers, computer monitors, and TVs. The vibration sensing may also be employed in devices that do not have an electronic display. In these cases, the SMI sensor 216 may be positioned to emit electromagnetic radiation toward a structural or housing component of the device 200, such as a structural or housing component that forms an exterior surface of the device. The SMI sensor 216 may also or alternatively be positioned to emit electromagnetic toward an internal component of the device 200 that is attached to a structural or housing component of the device 200 (and vibrates with, or similarly to, the structural or housing component).

Figure 3:
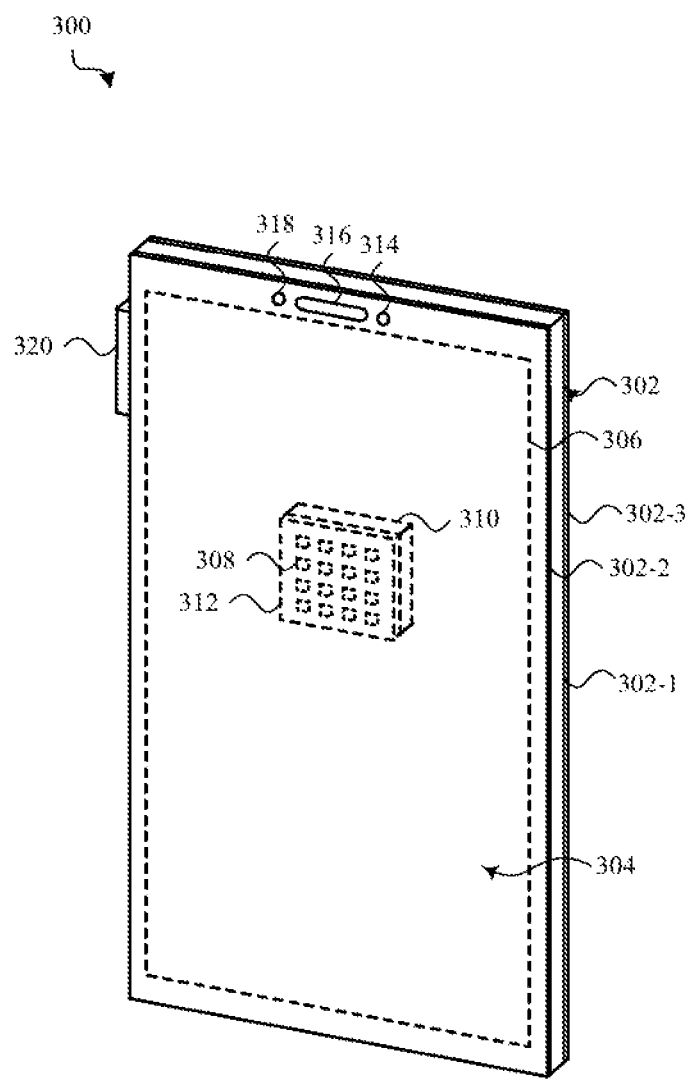
FIG. 3 shows an example of a device that includes an array of SMI sensors for sensing vibration of a structural or housing component of the device.

FIG. 3 shows an example of a device 300 that includes an array of SMI sensors 308 for sensing vibration of a structural or housing component 302 of the device 300. The device's dimensions and form factor suggest that the device 300 is a smartphone. However, the device 300 could alternatively be any type of mobile or handheld device, or a device that is permanently or semi-permanently installed at a single location (e.g., a TV or refrigerator). By way of example, FIG. 3 shows a front isometric view of the device 300.

In some embodiments, the structural components 302 of the device 300 may include a frame 302-1, a front cover 302-2, and a back cover 302-3 opposite the front cover 302-2. At least some of the structural components (e.g., each of the frame 302-1 and the front cover 302-2) may define part of an interior volume 304. Other structural components (e.g., the back cover 302-3) may or may not define part of the interior volume 304. In some embodiments, the frame 302-1 may define an opening to the interior volume 304, and the front cover 302-2 may be attached to the frame 302-1 to cover the opening. The structural components 302 may incorporate any or all aspects of the structural components described with reference to FIGS. 1A and 1B, or 2A and 2B. In some cases, the structural components 302 may include alternative or additional components.

The interior volume 304 may be sealed, not sealed, or vented, as described with reference to FIGS. 1A and 1B.

An electronic display 306 may be disposed within the interior volume 304 and configured to emit or project light (e.g., light that defines an image) through the cover 302-2. The electronic display 306 may be partially or completely surrounded by the frame 302-1 or cover 302-2, and in some cases may be mounted to the frame 302-1 and/or the cover 302-2. The electronic display 306 may take any of the configurations described with reference to FIGS. 1A and 1B.

An array of SMI sensors 308 may be positioned within the interior volume 304 (i.e., on the same side of the cover 302-2 as the display 306) and configured to detect vibration of the cover 302-2 (e.g., a varying displacement of the cover 302-2 in a direction perpendicular to a beam of electromagnetic radiation emitted by an SMI sensor 308). Each of the SMI sensors 308 may be configured to emit electromagnetic radiation toward a respective portion (different portions) of an interior surface or portion of the cover 302-2 (or toward a surface of an internal component of the device 300 that is attached to the cover), and to generate a respective SMI output including information indicative of vibration of the respective portion of the cover 302-2 or internal component. The array of SMI sensors 308 may be arranged in a one-dimensional (1D) array (i.e., a 1×N array, with N≥2), a 2D array (i.e., an M×N array, with M and N≥2), a 3D array, and/or an irregular array (e.g., the SMI sensors 308 need not be arranged on a rectangular grid, and in some cases need not be arranged symmetrically about any point or line). Circuitry 310 (e.g., a processor and/or other components) within the device 300 may be configured to characterize a vibratory waveform impinging on the device. The vibratory waveform may be characterized using at least two of the SMI outputs.

The size or pitch of the SMI sensors 308 may be made very small, enabling many self-mixing interferometry sensors to be arranged in a high-density array of SMI sensors. The integration of photodetectors with electromagnetic radiation sources (e.g., intra-cavity or on-chip extra-cavity), or even elimination of photodetectors, can also reduce sensor size, part count, and cost. In some cases, the array of SMI sensors 308 may include SMI sensors formed on a common substrate 312 (e.g., a common printed circuit board (PCB) or common semiconductor die). The array of SMI sensors 308 may be positioned behind the display 306 or adjacent the display 306, or the SMI sensors of the array may be integrated into a substrate of the display 306.

When SMI sensors 308 are positioned close to one another, in a one or two-dimensional array, their SMI outputs may be used in combination to provide a sensor with increased sensitivity to vibration, and to provide a sensor with an improved SNR. For example, the SMI outputs of two or more SMI sensors 308 may be summed. The summing may be performed in the time domain or the frequency domain, but the burden placed on a processor or summing circuitry may be decreased if the summing is performed in the time domain. In some cases, the signal strength or SNR of different SMI sensors 308 may be analyzed, and a subset of SMI outputs having higher signal strengths or SNRs may be summed.

In some cases, circuitry 310 within the device 300 may be configured to identify a user command embedded in sensed vibrations, and execute or transmit the user command, as described with reference to FIGS. 2A and 2B. In some cases, the user command may be identified using a summed SMI output (e.g., the user command may be identified in the summed SMI output).

The device 300 may include various other components. For example, the front of the device 300 may include one or more front-facing cameras 314, speakers 316, microphones, or other components 318 (e.g., audio, imaging, and/or sensing components) that are configured to transmit or receive signals to/from the device 300. In some cases, a front-facing camera 314, alone or in combination with other sensors, may be configured to operate as a bio-authentication or facial recognition sensor. The device 300 may also include buttons or other input devices positioned along a sidewall and/or on a front or rear surface of the device 300. For example, a volume button or multipurpose button 320 may be positioned along a sidewall of the device, and in some cases may extend through an aperture in the sidewall.

The vibration sensing described with reference to the device 300 may be employed in other types of devices having an electronic display, such as mobile phones, computers, computer monitors, and TVs. The vibration sensing may also be employed in devices that do not have an electronic display. In these cases, the SMI sensors 308 may be positioned to emit electromagnetic radiation toward a structural or housing component of the device 300, such as a structural or housing component that forms an exterior surface of the device. The SMI sensors 308 may also or alternatively be positioned to emit electromagnetic toward an internal component of the device 300 that is attached to a structural or housing component of the device 300 (and vibrates with, or similarly to, the structural or housing component).

In some embodiments, the SMI sensors 308 may be moved farther apart, such that a detectable phase difference in their SMI outputs can be discerned when the SMI sensors 308 receive vibrations from a source of vibrations (e.g., a person) located at a particular direction from the device 300. In some embodiments, the SMI sensors 308 shown in FIG. 3 (or some of the SMI sensors 308) may be positioned sufficiently far apart for circuitry to discern a phase difference between their SMI outputs. An array of SMI sensors spaced farther apart is described in more detail with reference to FIG. 4. However, the processes performed by the circuitry described with reference to FIG. 4 may also be performed by the circuitry 310 described with reference to FIG. 3.

Figure 4:
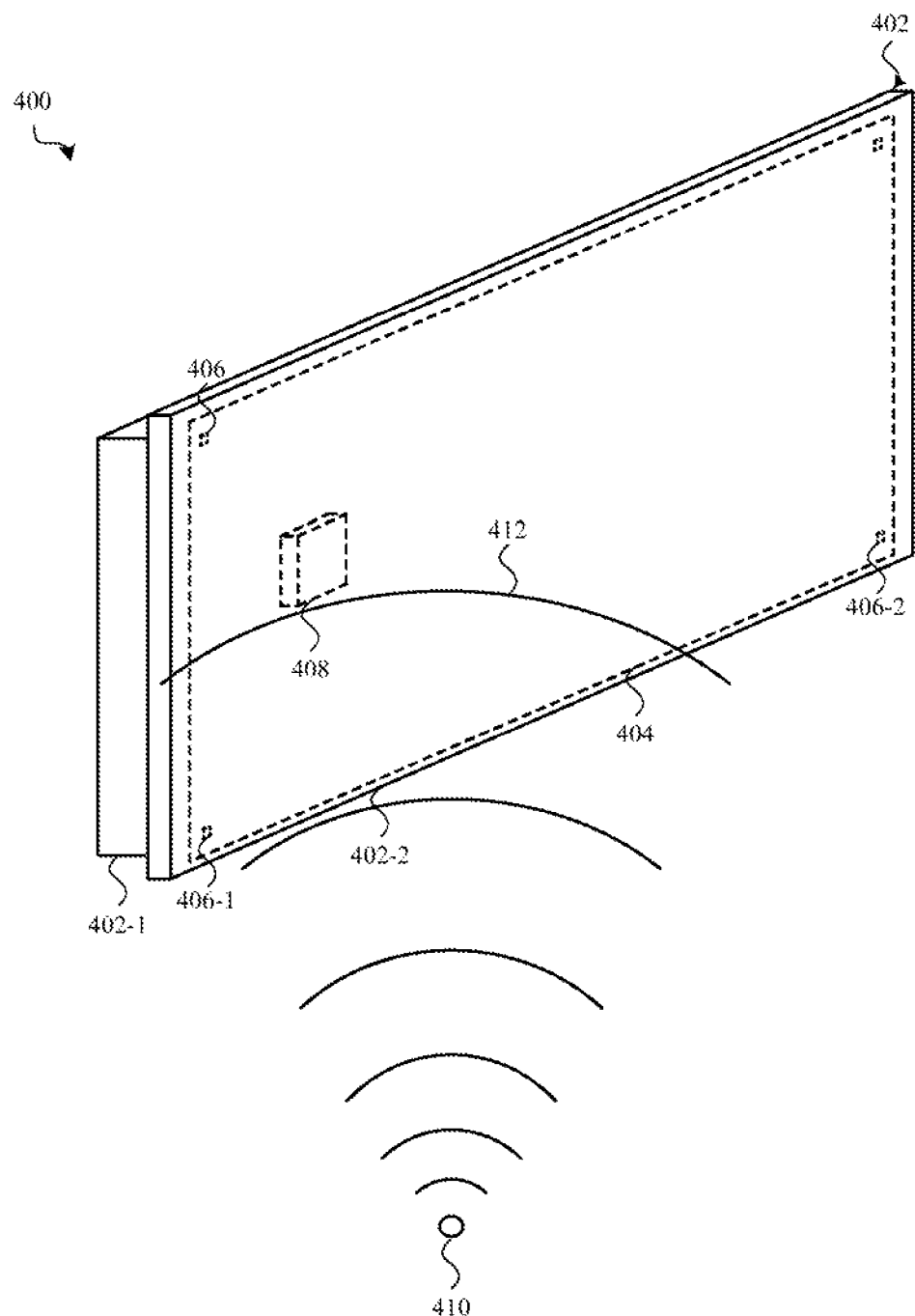
FIG. 4 shows another example of a device that includes an array of SMI sensors for sensing vibration of a structural or housing component of the device.

FIG. 4 shows another example of a device 400 that includes an array of SMI sensors 406 for sensing vibration of a structural or housing component 402 of the device 400. The device's dimensions and form factor suggest that the device 400 is a TV or computer monitor. However, the device 400 could alternatively be any type of device that is permanently or semi-permanently installed at a single location (e.g., a refrigerator), or a mobile or handheld device (e.g., a smartphone or computer). By way of example, FIG. 4 shows a front isometric view of the device 400.

In some embodiments, the structural components 402 of the device 400 may include a back cover 402-1 and a front cover 402-2. In some cases, the structural components 402 may include alternative or additional components. The structural components 402 may incorporate any or all aspects of similar structural components described with reference to FIGS. 1A and 1B, 2A and 2B, or 3.

An electronic display 404 may be disposed behind the front cover 402-2 and be configured to emit or project light (e.g., light that defines an image) through the front cover 402-2. The electronic display 404 may be partially or completely surrounded by the back cover 402-1 or front cover 402-2, and in some cases may be mounted to the back cover 402-1, front cover 402-2, or a frame to which the back and front covers 402-1, 402-2 are attached. The electronic display 404 may take any of the configurations described with reference to FIGS. 1A and 1B.

An array of SMI sensors 406 may be positioned behind the front cover 402-2 (i.e., on the same side of the front cover 402-2 as the display 404) and configured to detect vibration of the front cover 402-2 (e.g., a varying displacement of the cover 402-2 in a direction perpendicular to a beam of electromagnetic radiation emitted by an SMI sensor 406). Each of the SMI sensors 406 may be configured to emit electromagnetic radiation toward a respective portion of an interior surface of the front cover 402-2 (or respective portion of a surface of an internal component attached to the cover 402-2), and to generate a respective SMI output including information indicative of vibration of the respective portion of the front cover 402-2 or internal component. Circuitry 408 (e.g., a processor and/or other components) within the device 400 may be configured to characterize a vibratory waveform impinging on the device. The vibratory waveform may be characterized using at least two of the SMI outputs.

In some cases, the SMI sensors 406 of the array may be discrete sensors, such as sensors formed on different substrates disposed at different positions with respect to the front cover 402-2 (i.e., at different positions with respect to the extent (or a major surface) of the front cover 402-2).

When SMI sensors 406 are positioned far enough apart from one another, in a one- or two-dimensional array, a phase difference (e.g., a relative time delay) between their SMI outputs can be discerned and used to determine a direction and/or distance to a source 410 of a vibratory waveform (e.g., a person who speaks to generate an acoustic wave). The phase difference results from the wave nature of vibrations (which diverge in a spherical radiation pattern), and the fact that a wave front 412 of a vibratory waveform will impinge on different portions of a surface at different times, and cause the different portions of the surface to vibrate differently. For example, the wave front 412 of the vibratory waveform emitted by the source 410 will impinge on a portion of the front cover 402-2 above a lower left SMI sensor 406-1 before impinging on a portion of the front cover 402-2 above a lower right SMI sensor 406-2.

In some cases, circuitry 408 within the device 400 may determine a phase difference between at least two SMI outputs of the SMI sensor array 406, or phase differences between all of the SMI outputs. The circuitry 408 may then use at least one phase difference, and known positions of the SMI sensors 406, to determine a direction and/or distance to a source of a vibratory waveform. In some cases, the circuitry 408 may perform a three-dimensional (3D) localization of the course. The direction and/or distance may in some cases be determined using any of a number of triangulation algorithms.

In some embodiments, the circuitry 408 may be configured to make various inferences about the source of the vibratory waveform. For example, if the source is determined to be within a room in which the TV is installed, or if the source is determined to be within a particular distance of the TV, or if the source is determined to be approximately where a sofa is positioned, the TV may transition its electronic display from a low power or no power state to an operating power state. In some embodiments, the circuitry 408 may transition its electronic display from a low power or no power state to an operating power state after identifying at least one of: a user command embedded in the vibratory waveform, a voice of a person carried in the vibratory waveform, or a voice of a particular person (e.g., a voice of a person who has enrolled or been pre-authenticated to turn the TV on) carried in the vibratory waveform. In some embodiments, the circuitry 408 may transition its electronic display from a low power or no power state to an operating power state after determining that the source of a vibratory waveform is likely a person (e.g., based on information contained in the vibratory waveform, and/or a determined direction or distance of a source of the vibratory waveform (e.g., a location of a sofa or chair), and/or a determined change in a distance or location of the source of the vibratory waveform (e.g., footsteps suggesting that a person is moving to a predetermined viewing or listening location). In other words, the circuitry 408 may perform an operation in response to a determination that a user is present (i.e., the circuitry 408 may implement presence-detecting functionality).

The circuitry 408 may also perform other operations or make other inferences. For example, at least partly in response to determining the source of the vibratory waveform is likely a person (i.e., a determination that a person is likely present), the circuitry 408 may tune at least one of an audio signal (e.g., for stereo or multi-channel sound) or a video signal (e.g., for three-dimensional (3D) video) toward the source of the vibratory waveform. The circuitry 408 may also or alternatively beam-form an audio signal so that audio is received by a listener at a particular location, but not at the locations of other people, or the circuitry 408 may adjust the brightness or parallax of an image for off-axis viewing. The circuitry 408 may alternatively perform any of the operations described with reference to FIGS. 1A-3.

The vibration sensing described with reference to the device 400 may be employed in other types of devices having an electronic display, such as mobile phones, computers, computer monitors, and smart watches. The vibration sensing may also be employed in devices that do not have an electronic display. In these cases, the SMI sensors 406 may be positioned to emit electromagnetic radiation toward a structural or housing component of the device 400, such as a structural or housing component that forms an exterior surface of the device 400. The SMI sensors 406 may also or alternatively be positioned to emit electromagnetic toward an internal component of the device 400 that is attached to a structural or housing component of the device 400 (and vibrates with, or similarly to, the structural or housing component).

In an alternative embodiment of the device 400, the electronic display 404 and array of SMI sensors 406 may be replaced with a single SMI sensor that emits a beam of electromagnetic radiation that is both 1) modulated and scanned to project a viewable image through the front cover 402-2 and onto an image display surface (e.g., a screen or wall), and 2) monitored for an SMI output that indicates the vibration of various portions of the front cover 402-2 as the beam is scanned.

Figure 5:
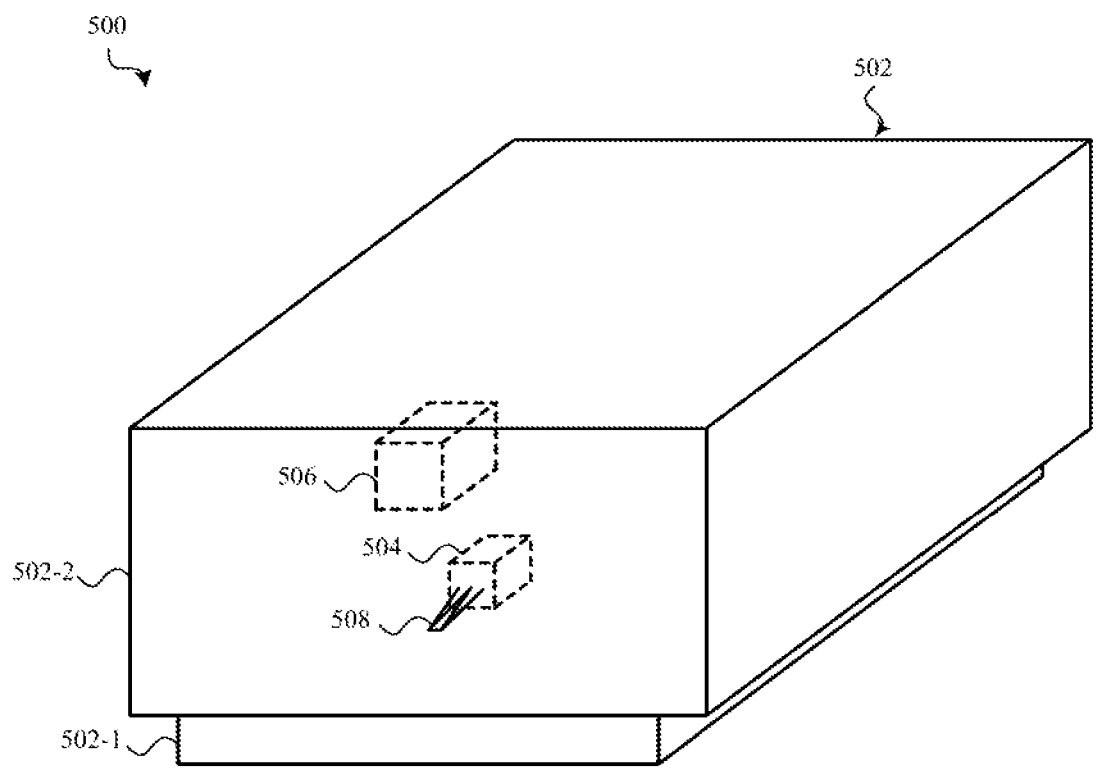
FIG. 5 shows another example of a device that includes one or more SMI sensors for sensing vibration of a structural or housing component of the device.

FIG. 5 shows another example of a device 500 that includes one or more SMI sensors 504 for sensing vibration of a structural or housing component 502 of the device 500. The device's dimensions and form factor suggest that the device 500 is a game console. However, the device 500 could alternatively be any type of device, such as a game controller, a pair of goggles, a smart speaker, a virtual assistant, or a toaster. By way of example, FIG. 5 shows a front isometric view of the device 500.

In some embodiments, the structural components 502 of the device 500 may include a base 502-1 and a cover 502-2. At least the cover 502-2 may be a structural component that defines an exterior surface (or multiple exterior surfaces) of the device 500. In some cases, the structural components 502 may include alternative or additional components. The structural components 502 may be formed of metal, plastic, or other materials.

The device 500 may not have an electronic display, or may have an electronic display that only displays alphanumeric characters and/or icons. In alternative embodiments, the device 500 may have any size or type of electronic display, or even multiple electronic displays.

One or more SMI sensors 504 may be positioned behind the cover 502-2 and configured to detect vibration of the cover 502-2 (e.g., a varying displacement of the cover 502-2 in a direction perpendicular to a beam of electromagnetic radiation emitted by the SMI sensor 504). Each SMI sensor 504 may be configured to emit electromagnetic radiation 508 toward a respective portion of an interior surface of the cover 502-2, or a surface of an internal component that is attached to the cover 502-2, and to generate a respective SMI output including information indicative of vibration of the respective portion of the cover 502-2 or internal component.

Circuitry 506 (e.g., a processor and/or other components) within the device 500 may be configured to characterize a vibratory waveform impinging on the device 500, as described with any of FIGS. 1A-4. In some cases, the circuitry 506 may be configured to use the SMI outputs of two or more SMI sensors to determine a direction and/or distance to a source of a vibratory waveform, as described, for example, with reference to FIG. 4. In some cases, the device 500 may also identify a user command embedded in the vibratory waveform (e.g., from information indicative of vibration of the cover 502-2), and may execute or transmit the user command. In some cases, the circuitry may be configured to execute or transmit the user command only after determining the user command was received from a predetermined direction or range of directions, and/or from a source located at a predetermined distance or range of distances. In this manner, the device 500 may be configured to ignore certain spurious user commands and/or vibrations that may be erroneously interpreted as containing user commands.

In some embodiments, the circuitry 506 may identify a predetermined code embedded in a vibratory waveform, and also determine a direction and/or distance to a source of the vibratory waveform. In this manner, the device 500 may determine a direction and/or distance to another device, and/or a location and/or orientation of another device. For example, the positions and/or orientations of a number of game controllers, sets of goggles, headsets, or other devices used in an augmented reality (AR), virtual reality (VR), or mixed reality (MR) environment may be determined by a game console, or by the controllers, goggles, headsets, and other devices themselves.

The circuitry 506 may alternatively perform any of the operations described with reference to FIGS. 1A-4.

Figure 6A:
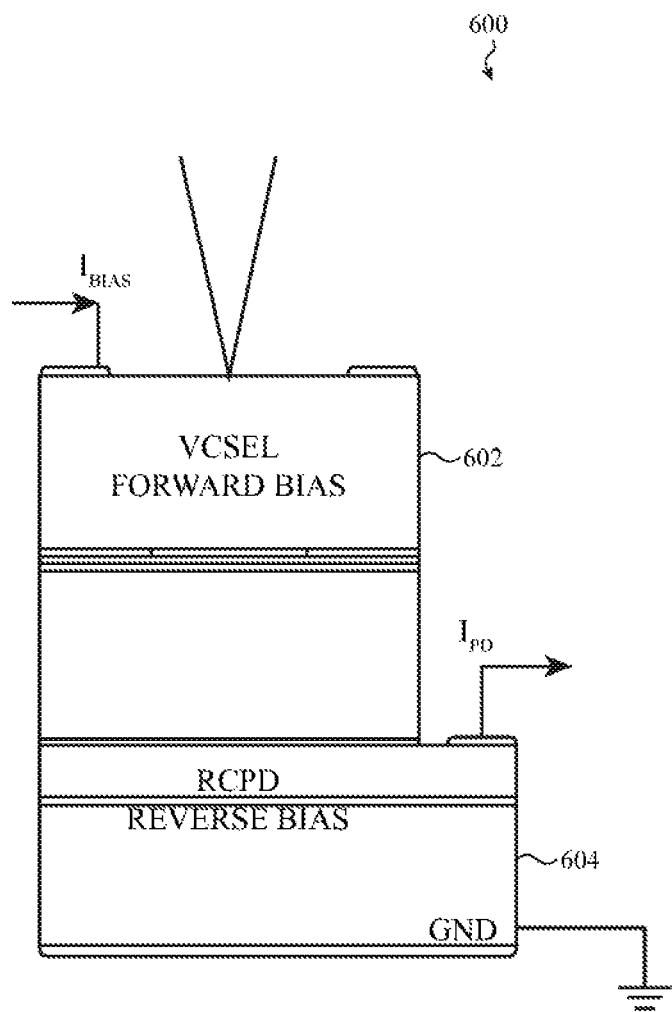
FIG. 6A depicts a first example SMI sensor that may be used in one or more of the input devices described with reference to FIGS. 1A-5.

FIG. 6A depicts a first example SMI sensor 600 that may be used in one or more of the devices described with reference to FIGS. 1A-5. In this example, the SMI sensor 600 may include a VCSEL 602 with an integrated resonant cavity (or intra-cavity) photodetector (RCPD) 604.

Figure 6B:
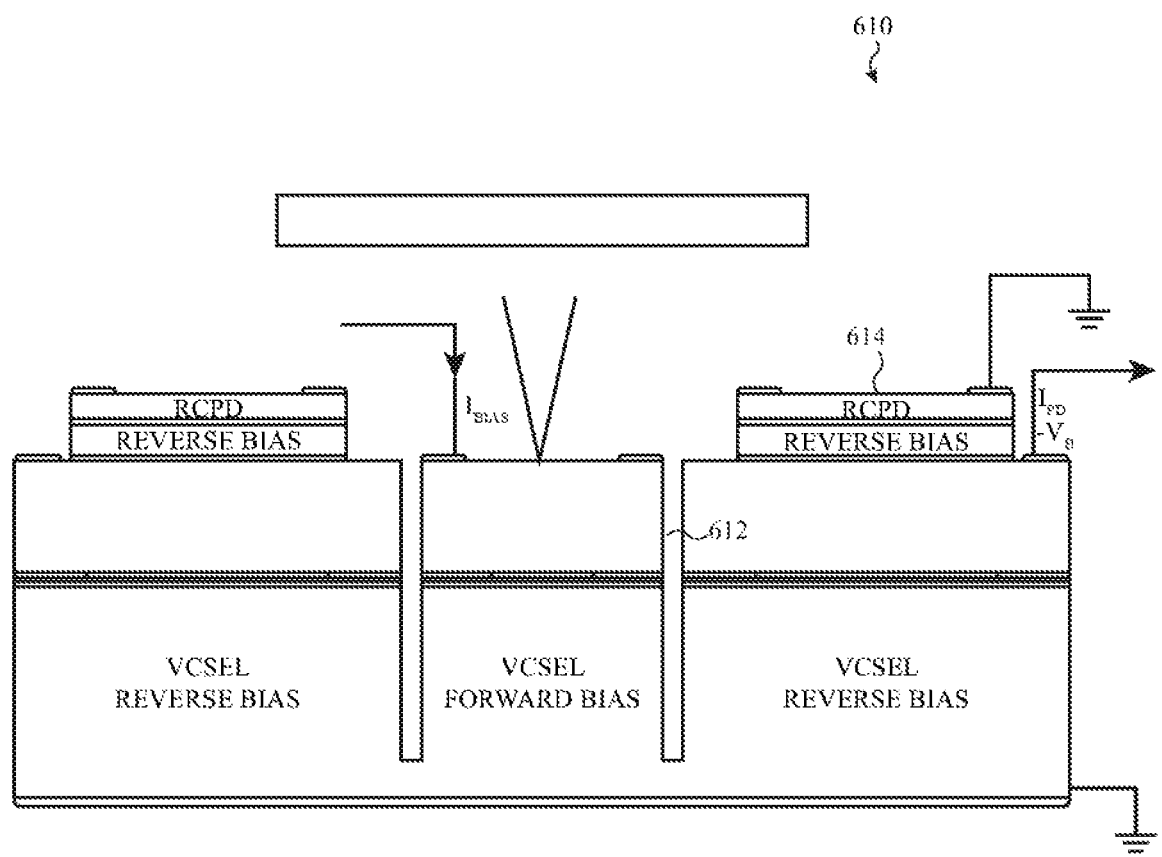
FIG. 6B depicts a second example SMI sensor that may be used in one or more of the input devices described with reference to FIGS. 1A-5.

FIG. 6B depicts a second example SMI sensor 610 that may be used in one or more of the devices described with reference to FIGS. 1A-5. In this example, the SMI sensor 610 may include a VCSEL 612 with an extrinsic on-chip RCPD 614. As an example, the RCPD 614 may form a disc around the VCSEL 612.

Figure 6C:
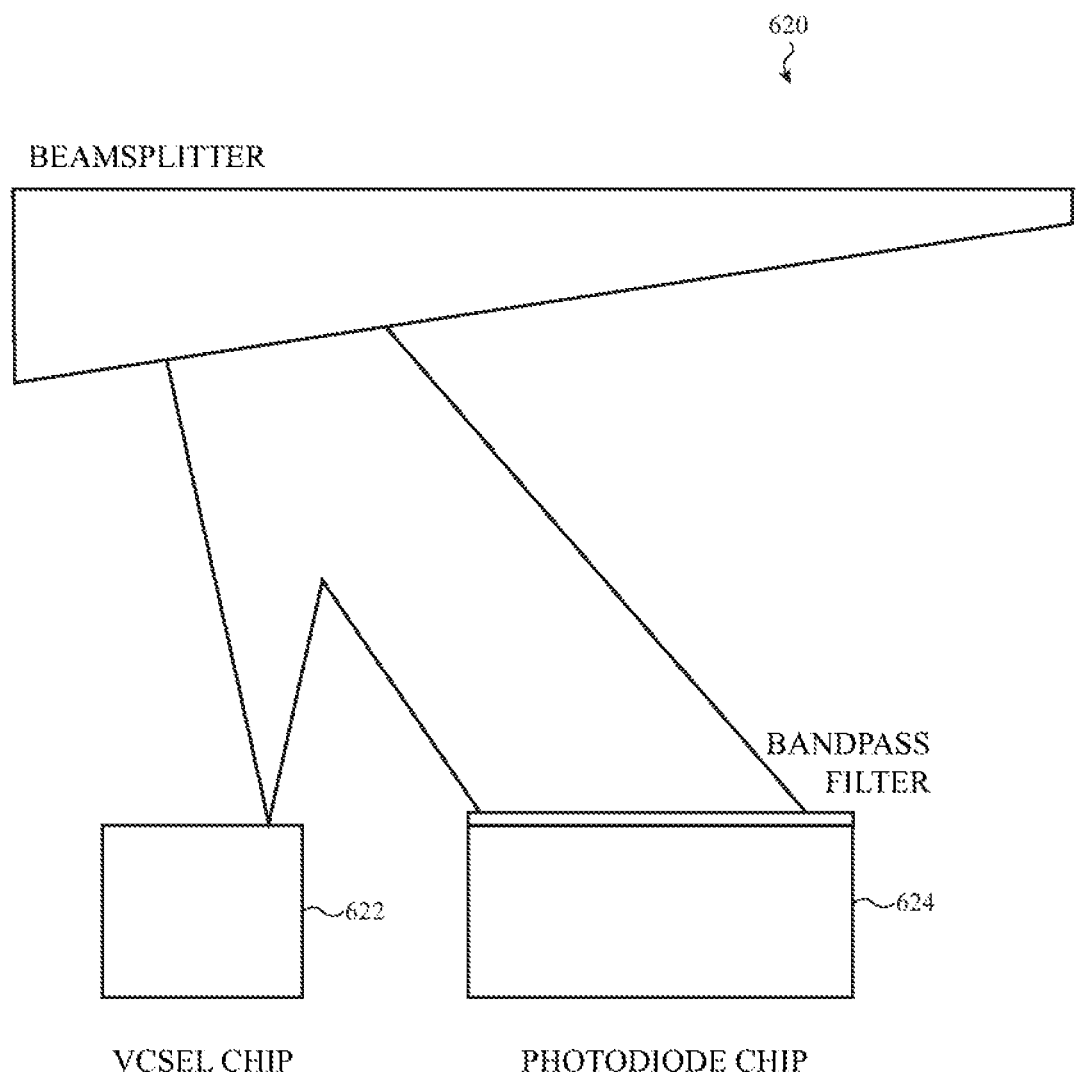
FIG. 6C depicts a third example SMI sensor that may be used in one or more of the input devices described with reference to FIGS. 1A-5.

FIG. 6C depicts a third example SMI sensor 620 that may be used in one or more of the devices described with reference to FIGS. 1A-5. In this example, the SMI sensor 620 may include a VCSEL 622 with an extrinsic off-chip photodetector 624.

Figure 6D:
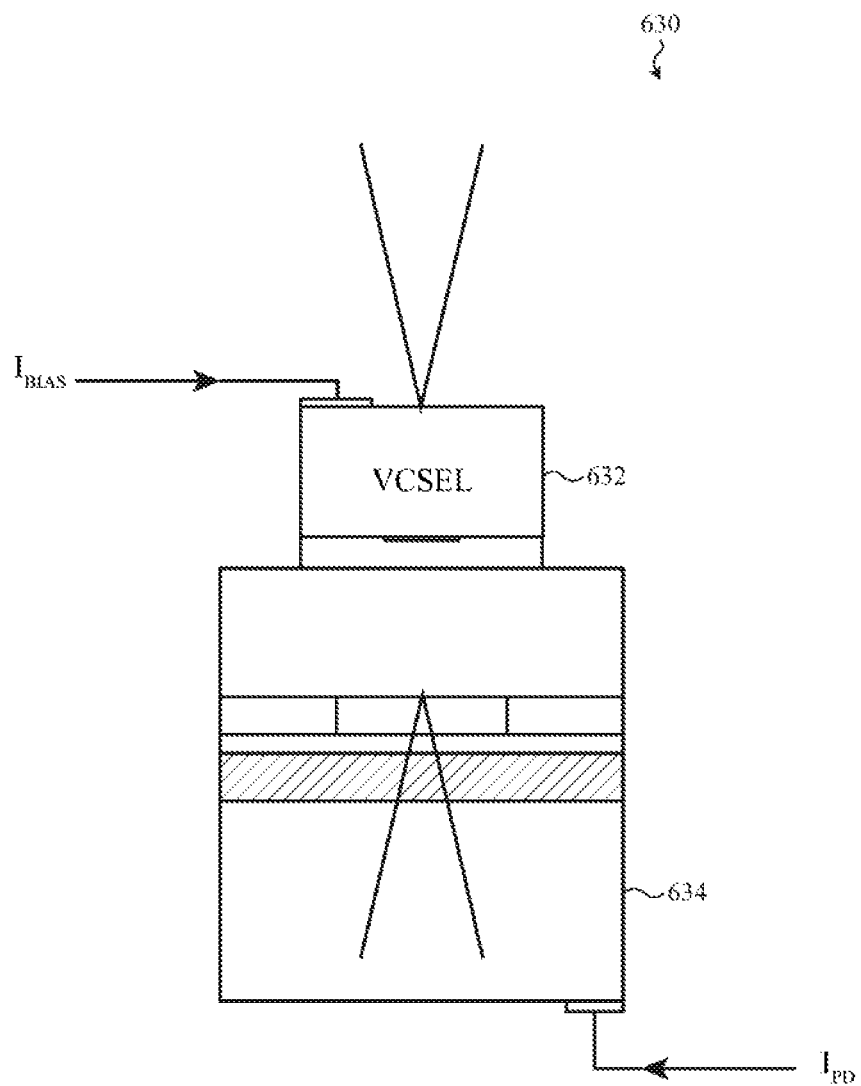
FIG. 6D depicts a fourth example SMI sensor that may be used in one or more of the input devices described with reference to FIGS. 1A-5.

FIG. 6D depicts a fourth example SMI sensor 630 that may be used in one or more of the devices described with reference to FIGS. 1A-5. In this example, the SMI sensor may include a dual-emitting VCSEL 632 with an extrinsic off-chip photodetector 634. For example, the top emission may be emitted towards optics and/or another target and the bottom emission may be provided to the extrinsic photodetector 634.

Figure 7:
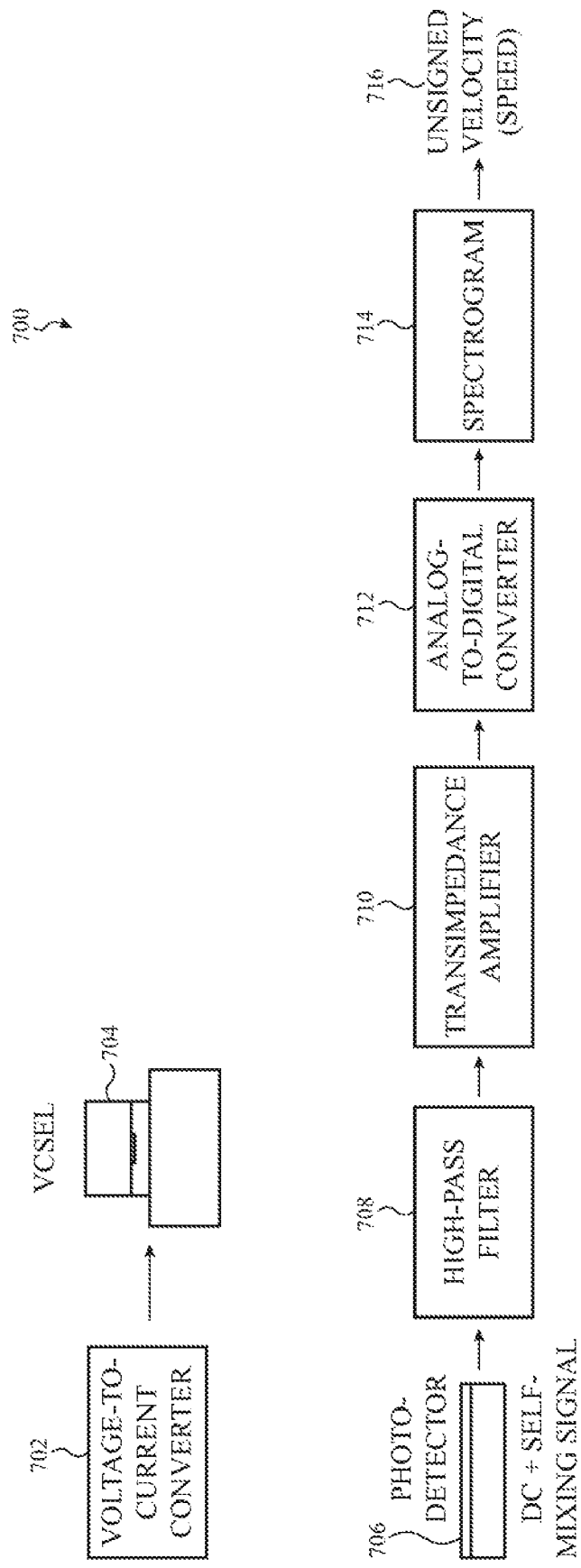
FIG. 7 depicts a direct current bias procedure for determining speed of an object using self-mixing interferometry.

FIG. 7 depicts a direct current bias procedure 700 for determining speed of an object using self-mixing interferometry. This procedure 700 may be used by one or more of the devices described with reference to FIGS. 1A-5, to characterize a vibratory waveform impinging on a structural or housing component.

The procedure 700 includes generating an initial digital signal and processing it using a voltage-to-current converter 702 to produce a bias current as an input to a VCSEL 704. In alternative embodiments, a digital signal may be not be necessary. For example, when the current is constant, a fixed analog voltage may be applied to the voltage-to-current converter 702. As described above, movement of a structural component of a device, such as a cover over an electronic display, can cause changes in an interferometric parameter, such as a parameter of the VCSEL 704 or of a photodetector 706. The changes can be measured to produce an SMI output. In the embodiment shown it will be assumed that the SMI output is output by a photodetector 706. In some cases, the SMI output may be filtered using a high-pass filter 708. Because the SMI output of the photodetector 706 may be a current, a transimpedance amplifier (TIA) 710 may be used to produce a corresponding voltage (with or without amplification) for further processing. The voltage may be sampled and quantized by an analog-to-digital converter (ADC) 712. The output of the ADC 712 may be used to generate a spectrogram 714 by means of a spectral analysis procedure (e.g., a fast Fourier transform), from which a speed of movement 716 (without direction) of the structural component may be determined.

Figure 8:
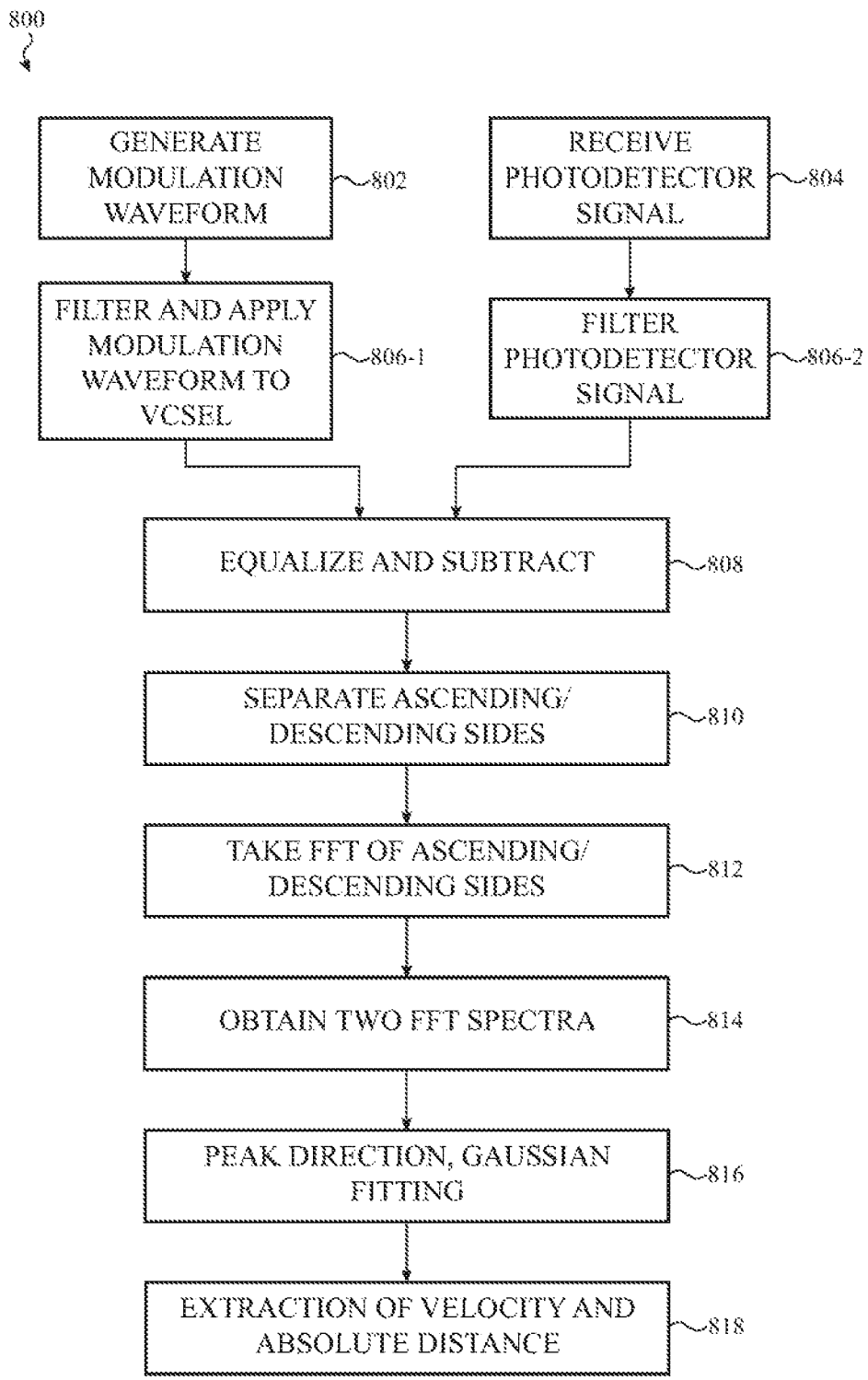
FIG. 8 depicts a triangular bias procedure for determining velocity and absolute distance of an object using self-mixing interferometry.
Figure 9:
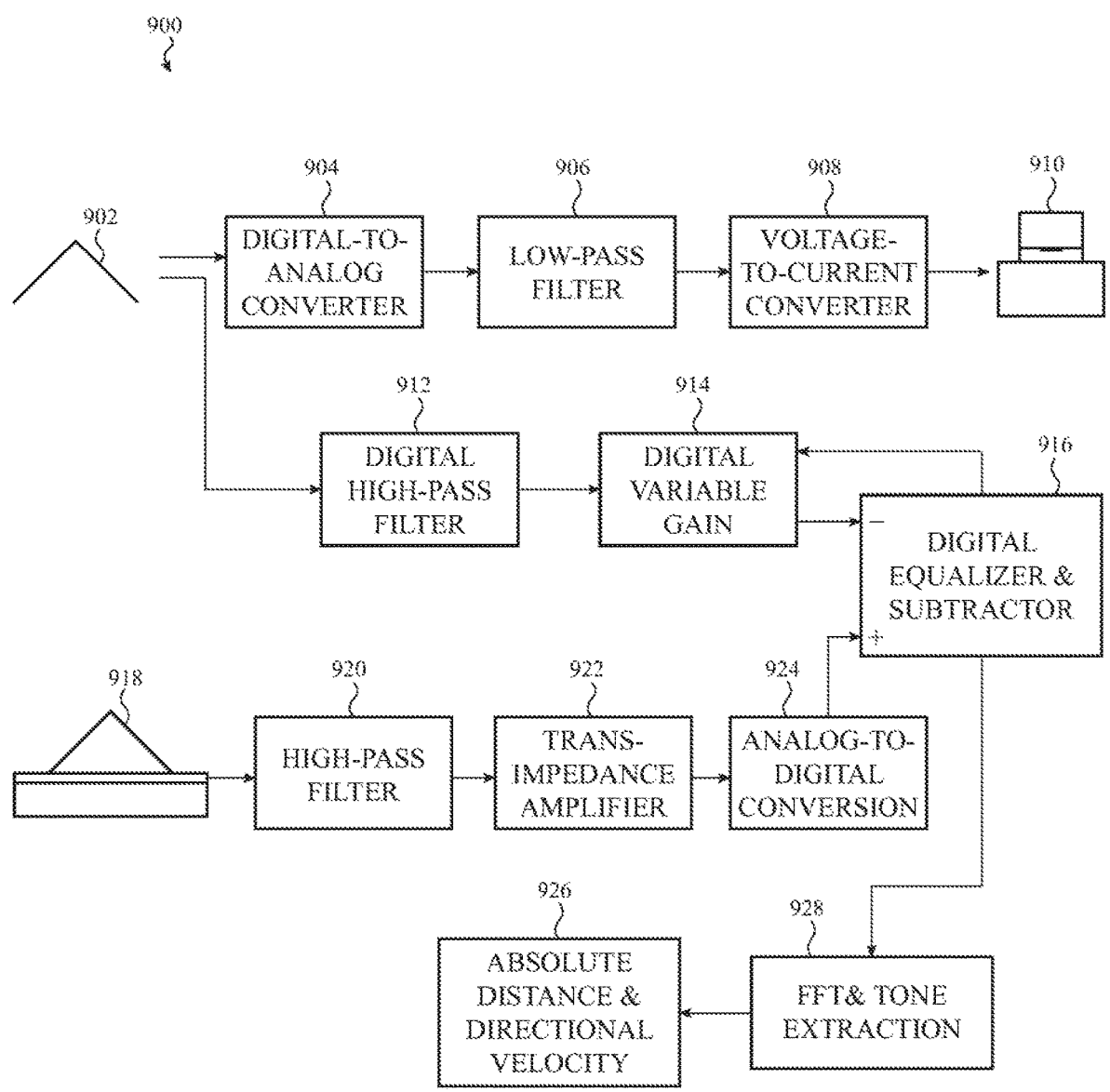
FIG. 9 depicts a block diagram of a system for implementing a spectrum analysis procedure using the procedure described with reference to FIG. 8.

FIGS. 8 and 9 respectively show a flow chart of a procedure 800 and a block diagram 900 of a system for implementing a spectrum analysis procedure that can be used as part of determining and/or estimating an absolute distance. The method and the system may drive or modulate a laser, such as one or more VCSELs, with a modulation current 902. The method and the system may also analyze an SMI output 918 related to an interferometric parameter. For purposes of explanation, in the embodiments of FIGS. 8 and 9 it will be assumed that the modulation current 902 has a triangle waveform. One of skill in the art will recognize how the method and the system can be implemented using alternative modulation current waveforms. The spectrum analysis method concurrently analyzes the modulation current 902 and an SMI output 918 based on an interferometric parameter. The modulation current 902 and the SMI output 918 may be received at respective receiving circuits. Such receiving circuits may be one or more of the blocks of the system shown in FIG. 9 and described below, or may be one or more dedicated processing units such as a graphics processing unit, an ASIC, or an FPGA, or may be a programmed microcomputer, microcontroller, or microprocessor. Various stages of the method may be performed by separate such processing units, or all stages by one (set of) processing unit(s).

FIG. 8 depicts a triangular bias procedure 800 for determining velocity and absolute distance of a structural component of a device, using self-mixing interferometry. This procedure 800 may be used by one or more of the devices described with reference to FIGS. 1A-5.

At an initial stage 802, an initial signal is generated, such as by a digital or analog signal generator. At stage 806-1, the generated initial signal is processed as needed to produce the triangle waveform modulation current 902 that is applied to a VCSEL (see FIG. 9). Stage 806-1 can be, as needed, operations of a digital-to-analog converter (DAC) (such as when the initial signal is an output of a digital step generator), low-pass filtering (such as to remove quantization noise from the DAC), and voltage-to-current conversion.

The application of the modulation current 902 to the VCSEL induces an SMI output 918 (i.e., a change in an interferometric property of the VCSEL). It will be assumed for simplicity of discussion that the SMI output 918 is from a photodetector, but in other embodiments it may be from another component.

At initial stage 804 in FIG. 8, the SMI output 918 is received. At stage 806-2, initial processing of the SMI output 918 is performed as needed. Stage 806-2 may include high-pass filtering or digital subtraction.

At stage 808, a processor may equalize the received signals in order to match their peak-to-peak values, mean values, root-mean-square values, or any other characteristic values, if necessary. For example the SMI output 918 may be a predominant triangle waveform component being matched to the modulation current 902, with a smaller and higher frequency component due to changes in the interferometric property. High-pass filtering may be applied to the SMI output 918 to obtain the component signal related to the interferometric property. Also this stage may involve separating and/or subtracting the parts of the SMI output 918 and the modulation current 902 corresponding to the ascending and to the descending time intervals of the modulation current 902. This stage may include sampling the separated information.

At stages 810 and 812, a separate fast Fourier transform (FFT) may be first performed on the parts of the processed SMI output 918 corresponding to the ascending and to the descending time intervals. The two FFT spectra may be analyzed at stage 814.

At stage 816, the FFT spectra may be further processed, such as to remove artifacts and reduce noise. Such further processing can include peak detection and Gaussian fitting around the detected peak for increased frequency precision. From the processed FFT spectra data, information regarding the absolute distance can be obtained at stage 818.

FIG. 9 shows a block diagram of a system that may implement the spectrum analysis described in the method described above with respect to FIG. 8. In the exemplary system shown, the system includes generating an initial digital signal and processing it as needed to produce a modulation current 902 as an input to the VCSEL 910. In an illustrative example, an initial step signal may be produced by a digital generator to approximate a triangle function. The digital output values of the digital generator are used in the digital-to-analog converter (DAC) 904. The resulting voltage signal may then be filtered by the low-pass filter 906 to remove quantization noise. Alternatively, an analog signal generator based on an integrator can be used to generate an equivalent voltage signal directly. The filtered voltage signal then is an input to a voltage-to-current converter 908 to produce the desired modulation current 902 in a form for input to the VCSEL 910.

As described above, movement of a target can cause changes in an interferometric parameter, such as a parameter of the VCSEL 910 or of a photodetector operating in the system. The changes can be measured to produce an SMI output 918. In the embodiment shown, it will be assumed the SMI output 918 is measured by a photodetector. For the modulation current 902 having the triangle waveform, the SMI output 918 may be a triangle wave of a similar period combined with a smaller and higher frequency signal related to the interferometric property. In some cases, the SMI output 918 may not be perfectly linear, even though the modulation current 902 is linear. This may be a result of the bias current verses light output curve of the VCSEL 910 being non-linear (e.g., due to non-idealities, such as self-heating effects).

The SMI output 918 is first passed into the high-pass filter 920, which can effectively convert the major ascending and descending ramp components of the SMI output 918 to DC offsets. As the SMI output 918 may typically be a current, the transimpedance amplifier 922 can produce a corresponding voltage output (with or without amplification) for further processing.

The voltage output can then be sampled and quantized by the ADC block 924. Before immediately applying a digital FFT to the output of the ADC block 924, it can be helpful to apply equalization. The initial digital signal values from the digital generator used to produce the modulation current 902 are used as input to the digital high-pass filter 912 to produce a digital signal to correlate with the output of the ADC block 924. An adjustable gain can be applied by the digital variable gain block 914 to the output of the digital high-pass filter 912.

The output of the digital variable gain block 914 is used as one input to the digital equalizer and subtractor block 916. The other input to the digital equalizer and subtractor block 916 is the output of the ADC block 924. The two signals are differenced, and used as part of a feedback to adjust the gain provided by the digital variable gain block 914.

Equalization and subtraction may be used to clean up any remaining artifacts from the triangle that may be present in the SMI output 918. For example, if there is a slope error or nonlinearity in the SMI output 918, the digital high-pass filter 912 may not fully eliminate the triangle and artifacts may remain. In such a situation, these artifacts may show up as low frequency components after the FFT and make the peak detection difficult for nearby objects. Applying equalization and subtraction may partially or fully remove these artifacts.

Once an optimal correlation is obtained by the feedback, an FFT, indicated by block 928, can then be applied to the components of the output of the ADC block 924 corresponding to the rising and descending side of the triangle wave. From the FFT spectra obtained, absolute distance and/or directional velocity may be inferred using the detected peak frequencies on the rising and descending sides, as discussed above and indicated by block 926.

The method just described, and its variations, involve applying a spectrum analysis to an SMI output. However, it is understood that this is an example. In other implementations, alternate methods for determining absolute distances may be obtained directly from a time domain SMI output, without applying a spectrum analysis. Various configurations are possible and contemplated without departing from the scope of the present disclosure.

Figure 10:
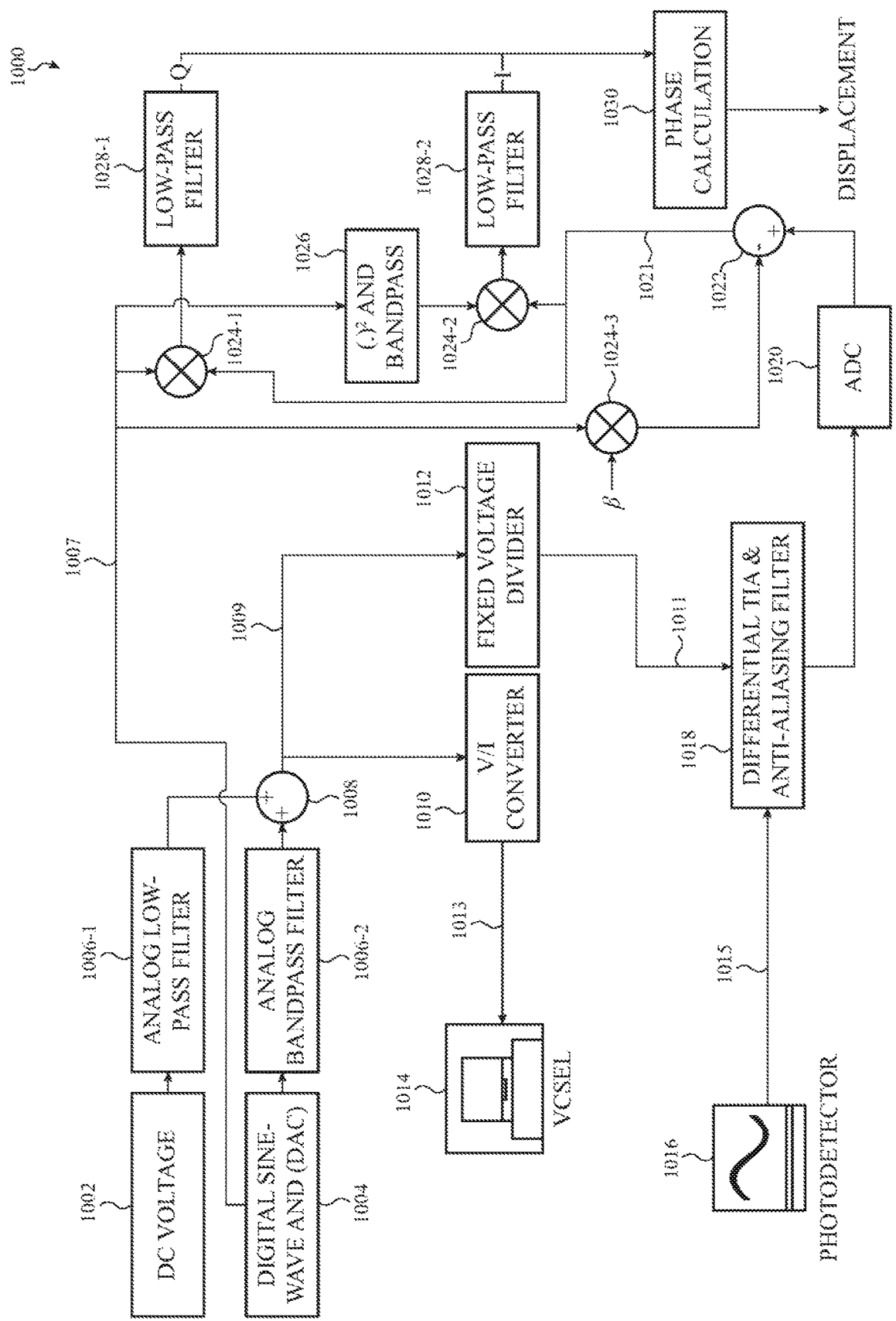
FIG. 10 depicts a sinusoidal bias procedure for determining displacement of an object using quadrature demodulation with self-mixing interferometry.

FIG. 10 depicts a sinusoidal bias procedure 1000 for determining displacement of an object using quadrature demodulation with self-mixing interferometry. This procedure 1000 may be used by one or more of the devices described with reference to FIGS. 1A-5.

As explained in more detail below, FIG. 10 shows components which generate and apply a sinusoidally modulated bias current to a VCSEL. The sinusoidal bias current can generate in a photodetector 1016 an output current depending on the frequency of the sinusoidal bias and the displacement to the structural component of the device. In the circuit of FIG. 10, the photodetector's 1016 output current is digitally sampled and then multiplied with a first sinusoid at the frequency of the original sinusoidal modulation of the bias current, and a second sinusoid at double that original frequency. The two separate multiplied outputs are then each low-pass filtered and the phase of the interferometric parameter may be calculated. Thereafter the displacement is determined using at least the phase.

The DC voltage generator 1002 is used to generate a constant bias voltage. A sine wave generator 1004 may produce an approximately single frequency sinusoid signal, to be combined with constant voltage. As shown in FIG. 10, the sine wave generator 1004 is a digital generator, though in other implementations it may produce an analog sine wave. The low-pass filter 1006-1 provides filtering of the output of the DC voltage generator 1002 to reduce undesired varying of the constant bias voltage. The bandpass filter 1006-2 can be used to reduce distortion and noise in the output of the sine wave generator 1004 to reduce noise, quantization or other distortions, or frequency components of its signal away from its intended modulation frequency, $\omega_m$.

The circuit adder 1008 combines the low-pass filtered constant bias voltage and the bandpass filtered sine wave to produce on link 1009 a combined voltage signal which, in the embodiment of FIG. 10, has the form $V_0+V_m \sin(\omega_m t)$. This voltage signal is used as an input to the voltage-to-current converter 1010 to produce a current to drive the lasing action of the VCSEL 1014. The current from the voltage-to-current converter 1010 on the line 1013 can have the form $I_0+I_m \sin(\omega_m t)$.

The VCSEL 1014 is thus driven to emit a laser light modulated as described above. Reflections of the modulated laser light may then be received back within the lasing cavity of VCSEL 1014 and cause self-mixing interference. The resulting emitted optical power of the VCSEL 1014 may be modified due to self-mixing interference, and this modification can be detected by the photodetector 1016. As described above, in such cases the photocurrent output of the photodetector 1016 on the link 1015 can have the form: $i_{PD}=i_0+i_m \sin(\omega_m t)+\gamma \cos(\varphi_0+\varphi_m \sin(\omega_m t))$. As the I/Q components to be used in subsequent stages are based on just the third term, the first two terms can be removed or reduced by the differential transimpedance amplifier and anti-aliasing (DTIA/AA) filter 1018. To do such a removal/reduction, a proportional or scaled value of the first two terms is produced by the voltage divider 1012. The voltage divider 1012 can use as input the combined voltage signal on the link 1009 produced by the circuit adder 1008. The output of the voltage divider 1012 on link 1011 can then have the form: $\alpha(V_0+V_m \sin(\omega_m t))$. The photodetector current and this output of the voltage divider 1012 can be the inputs to the DTIA/AA filter 1018. The output of the DTIA/AA filter 1018 can then be, at least mostly, proportional to the third term of the photodetector current.

The output of the DTIA/AA filter 1018 may then be quantized for subsequent calculation by the analog-to-digital converter (ADC) block 1020. Further, the output of the ADC block 1020 may have a residual signal component proportional to the sine wave originally generated by the sine wave generator 1004. To filter this residual signal component, the originally generated sine wave can be scaled (such as by the indicated factor of β) at multiplier block 1024-3, and then subtracted from the output of ADC block 1020 at subtraction block 1022. The filtered output on link 1021 may have the form: $A+B \sin(\omega_m t)+C \cos(2\omega_m t)+D \sin(3\omega_m t)+ \ldots$ , from the Fourier expansion of the $\gamma \cos(\varphi_0+\varphi_m \sin(\omega_m t))$ term discussed above. The filtered output can then be used for extraction of the I/Q components by mixing.

The digital sine wave originally generated by sine wave generator 1004 onto link 1007 is mixed (multiplied) by the multiplier block 1024-1 with the filtered output on link 1021. This product is then low-pass filtered at block 1028-1 to obtain the Q component discussed above, possibly after scaling with a number that is related to the amount of frequency modulation of the laser light and distance to the target.

Also, the originally generated digital sine wave is used as input into the squaring/filtering block 1026 to produce a digital cosine wave at a frequency double that of the originally produced digital sine wave. The digital cosine wave is then mixed (multiplied) at the multiplier block 1024-2 with the filtered output of the ADC block 1020 on link 1021. This product is then low-pass filtered at block 1028-2 to obtain the I component discussed above, possibly after scaling with a number that is related to the amount of frequency modulation of the laser light and distance to the target.

The Q and the I components are then used by the phase calculation component 1030 to obtain the phase from which the displacement of the target can be calculated, as discussed above.

One skilled in the art will appreciate that while the embodiment shown in FIG. 10 makes use of the digital form of the originally generated sine wave produced by sine wave generator 1004 onto link 1007, in other embodiments the originally generated sine wave may be an analog signal and mixed with an analog output of the DTIA/AA filter 1018. In other embodiments, the voltage divider 1012 may be a variable voltage divider. In still other embodiments, the voltage divider 1012 may be omitted and the differential TIA and anti-aliasing filter 1018 may be a single-ended differential TIA and anti-aliasing filter. In such embodiments, subtraction may be done only digitally at subtraction block 1022. In yet other embodiments, the subtraction block 1022 may be omitted and no subtraction of the modulation current may be performed.

The circuit of FIG. 10 can be adapted to implement the modified I/Q method described above that uses $Q' \propto \text{Lowpass}\{I_{PD} \times \sin(3\omega_m t)\}$. Some such circuit adaptations can include directly generating both mixing signals $\sin(2\omega_m t)$ and $\sin(3\omega_m t)$, and multiplying each with the output of the ADC block 1020, and then applying respective low-pass filtering, such as by the blocks 1028-1, 1028-2. The differential TIA and anti-aliasing filter 1018 may then be replaced by a filter to remove or greatly reduce the entire component of $I_{PD}$ at the original modulation frequency $\omega_m$. One skilled in the art will recognize other circuit adaptations for implementing this modified I/Q method. For example, the signal $\sin(3\omega_m t)$ may be generated by multiplying link 1007 and the output of squaring/filtering block 1026, and subsequently performing bandpass filtering to reject frequency components other than $\sin(3\omega_m t)$.

In additional and/or alternative embodiments, the I/Q time domain based methods just described may be used with the spectrum based methods of the first family of embodiments. The spectrum methods of the first family can be used at certain times to determine the absolute distance to the target, and provide a value of $L_0$. Thereafter, during subsequent time intervals, any of the various I/Q methods just described may be used to determine $\Delta L$.

In additional and/or alternative embodiments, the spectrum methods based on triangle wave modulation of a bias current of a VCSEL may be used as a guide for the I/Q time domain methods. The I/Q methods operate optimally in the case that $J_1(b) = J_2(b)$, so that the I and Q components have the same amplitude. However, b depends on the distance L. An embodiment may apply a triangle wave modulation to the VCSEL's bias current to determine a distance to a point of interest. Then this distance is used to find the optimal peak-to-peak sinusoidal modulation of the bias current to use in an I/Q approach. Such a dual method approach may provide improved signal-to-noise ratio and displacement accuracy obtained from the I/Q method.

Figure 11:
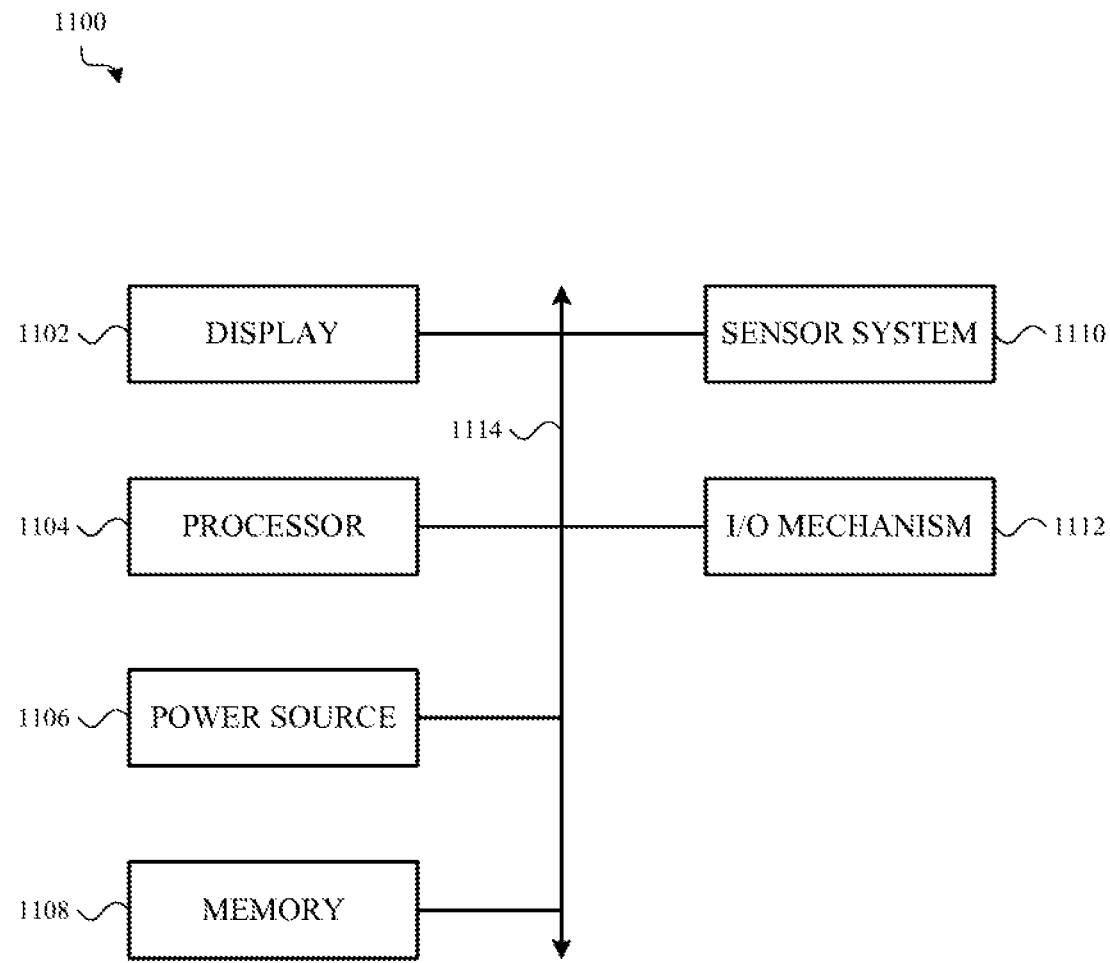
FIG. 11 shows an example electrical block diagram of an electronic device.

FIG. 11 shows a sample electrical block diagram of an electronic device 1100, which electronic device may in some cases be implemented as any of the devices described with reference to FIGS. 1A-5. The electronic device 1100 may include an electronic display 1102 (e.g., a light-emitting display), a processor 1104, a power source 1106, a memory 1108 or storage device, a sensor system 1110, or an input/output (I/O) mechanism 1112 (e.g., an input/output device, input/output port, or haptic input/output interface). The processor 1104 may control some or all of the operations of the electronic device 1100. The processor 1104 may communicate, either directly or indirectly, with some or all of the other components of the electronic device 1100. For example, a system bus or other communication mechanism 1114 can provide communication between the electronic display 1102, the processor 1104, the power source 1106, the memory 1108, the sensor system 1110, and the I/O mechanism 1112.

The processor 1104 may be implemented as any electronic device capable of processing, receiving, or transmitting data or instructions, whether such data or instructions is in the form of software or firmware or otherwise encoded. For example, the processor 1104 may include a microprocessor, a central processing unit (CPU), an application-specific integrated circuit (ASIC), a digital signal processor (DSP), a controller, or a combination of such devices. As described herein, the term "processor" is meant to encompass a single processor or processing unit, multiple processors, multiple processing units, or other suitably configured computing element or elements. In some cases, the processor 1104 may provide part or all of the circuitry described with reference to any of FIGS. 1A-5.

It should be noted that the components of the electronic device 1100 can be controlled by multiple processors. For example, select components of the electronic device 1100 (e.g., the sensor system 1110) may be controlled by a first processor and other components of the electronic device 1100 (e.g., the electronic display 1102) may be controlled by a second processor, where the first and second processors may or may not be in communication with each other.

The power source 1106 can be implemented with any device capable of providing energy to the electronic device 1100. For example, the power source 1106 may include one or more batteries or rechargeable batteries. Additionally or alternatively, the power source 1106 may include a power connector or power cord that connects the electronic device 1100 to another power source, such as a wall outlet.

The memory 1108 may store electronic data that can be used by the electronic device 1100. For example, the memory 1108 may store electrical data or content such as, for example, audio and video files, documents and applications, device settings and user preferences, timing signals, control signals, and data structures or databases. The memory 1108 may include any type of memory. By way of example only, the memory 1108 may include random access memory, read-only memory, Flash memory, removable memory, other types of storage elements, or combinations of such memory types.

The electronic device 1100 may also include one or more sensor systems 1110 positioned almost anywhere on the electronic device 1100. In some cases, the sensor systems 1110 may include one or more SMI sensors, positioned as described with reference to any of FIGS. 1A-5. The sensor system(s) 1110 may be configured to sense one or more type of parameters, such as but not limited to, vibration; light; touch; force; heat; movement; relative motion; biometric data (e.g., biological parameters) of a user; air quality; proximity; position; connectedness; and so on. By way of example, the sensor system(s) 1110 may include an SMI sensor, a heat sensor, a position sensor, a light or optical sensor, an accelerometer, a pressure transducer, a gyroscope, a magnetometer, a health monitoring sensor, and an air quality sensor, and so on. Additionally, the one or more sensor systems 1110 may utilize any suitable sensing technology, including, but not limited to, interferometric, magnetic, capacitive, ultrasonic, resistive, optical, acoustic, piezoelectric, or thermal technologies.

The I/O mechanism 1112 may transmit or receive data from a user or another electronic device. The I/O mechanism 1112 may include the electronic display 1102, a touch sensing input surface, a crown, one or more buttons (e.g., a graphical user interface "home" button), one or more cameras (including an under-display camera), one or more microphones or speakers, one or more ports such as a microphone port, and/or a keyboard. Additionally or alternatively, the I/O mechanism 1112 may transmit electronic signals via a communications interface, such as a wireless, wired, and/or optical communications interface. Examples of wireless and wired communications interfaces include, but are not limited to, cellular and Wi-Fi communications interfaces.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description.

They are not targeted to be exhaustive or to limit the embodiments to the precise forms disclosed. It will be apparent to one of ordinary skill in the art, after reading this description, that many modifications and variations are possible in view of the above teachings.

As described above, one aspect of the present technology is the gathering and use of data available from various sources, including vibratory and/or acoustic data. The present disclosure contemplates that, in some instances, this gathered data may include personal information data that uniquely identifies or can be used to contact or locate a specific person (e.g., a voice pattern, or confidential information spoken by a person). Such personal information data can include demographic data, location-based data, telephone numbers, email addresses, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to record a user's voice or input passwords. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A device, comprising:
   an electronic display;
   a cover through which the electronic display projects an image;
   an array of self-mixing interferometry (SMI) sensors positioned on a same side of the cover as the electronic display, wherein each SMI sensor is configured to:
     emit electromagnetic radiation toward a respective portion of an interior surface of the cover; and
     generate a respective SMI output including information indicative of vibration of the respective portion of the cover; and
   circuitry configured to characterize, using at least two of the SMI outputs, a vibratory waveform impinging on the device.

2. The device of claim 1, wherein the circuitry is further configured to:
   determine at least one phase difference between the at least two of the SMI outputs; and determine, using the at least one phase difference and known positions of the SMI sensors, a direction to a source of the vibratory waveform.

3. The device of claim 2, wherein the circuitry is further configured to:
determine, using the at least one phase difference and known positions of the SMI sensors, a distance to the source of the vibratory waveform.

4. The device of claim 2, wherein the circuitry is further configured to:
determine whether the source of the vibratory waveform is likely a person; and
at least partly in response to determining the source of the vibratory waveform is likely a person, tune at least one of an audio signal or a video signal toward the source of the vibratory waveform.

5. The device of claim 2, wherein the circuitry is further configured to:
determine whether the source of the vibratory waveform is likely a person; and
at least partly in response to determining the source of the vibratory waveform is likely a person, transition the electronic display from a low power or no power state to an operating power state.

6. The device of claim 1, wherein the circuitry is further configured to:
sum the at least two of the SMI outputs in the time domain.

7. The device of claim 1, wherein the array of SMI sensors comprises SMI sensors formed on different substrates disposed at different positions with respect to the cover.

8. The device of claim 1, wherein the array of SMI sensors comprises SMI sensors formed on a common substrate.

9. A device, comprising:
an electronic display;
a cover through which the electronic display projects an image;
an array of self-mixing interferometry (SMI) sensors positioned on a same side of the cover as the electronic display, wherein each SMI sensor is configured to:
emit electromagnetic radiation toward a respective portion of a surface of a component of the device attached to the cover; and
generate a respective SMI output including information indicative of vibration of the respective portion of the component; and circuitry configured to characterize, using at least two of the SMI outputs, a vibratory waveform impinging on the device.

10. The device of claim 9, wherein the circuitry is further configured to:
determine at least one phase difference between the at least two of the SMI outputs; and
determine, using the at least one phase difference and known positions of the SMI sensors, a direction to a source of the vibratory waveform.

11. The device of claim 10, wherein the circuitry is further configured to:
determine, using the at least one phase difference and known positions of the SMI sensors, a distance to the source of the vibratory waveform.

12. The device of claim 10, wherein the circuitry is further configured to:
determine whether the source of the vibratory waveform is likely a person; and
at least partly in response to determining the source of the vibratory waveform is likely a person, tune at least one of an audio signal or a video signal toward the source of the vibratory waveform.

13. The device of claim 10, wherein the circuitry is further configured to:
determine whether the source of the vibratory waveform is likely a person; and
at least partly in response to determining the source of the vibratory waveform is likely a person, transition the electronic display from a low power or no power state to an operating power state.

14. The device of claim 9, wherein the circuitry is further configured to:
sum the at least two of the SMI outputs in the time domain.

15. The device of claim 9, wherein the array of SMI sensors comprises SMI sensors formed on different substrates disposed at different positions with respect to the cover.

16. The device of claim 9, wherein the array of SMI sensors comprises SMI sensors formed on a common substrate.

* * * * *